US008339945B2

(12) United States Patent  
Connors

(10) Patent No.: US 8,339,945 B2
(45) Date of Patent: Dec. 25, 2012

(54) DATA LINK CONTROL ARCHITECTURE FOR INTEGRATED CIRCUIT DEVICES

(75) Inventor: Dennis P. Connors, San Diego, CA (US)

(73) Assignee: MWorks Wireless Holdings LLC, Wilmington, DE (US)

( * ) Notice: Subject to any disclaimer, the term of this patent is extended or adjusted under 35 U.S.C. 154(b) by 861 days.

(21) Appl. No.: 10/876,280

(22) Filed: Jun. 23, 2004

(65) Prior Publication Data

US 2005/0141558 A1 Jun. 30, 2005

Related U.S. Application Data

(60) Provisional application No. 60/484,568, filed on Jul. 1, 2003.

(51) Int. Cl.
*H04J 3/17* (2006.01)
*H04L 12/56* (2006.01)
(52) U.S. Cl. ........................................ 370/230; 370/352
(58) Field of Classification Search .................. 370/464, 370/469, 535; 709/224
See application file for complete search history.

(56) References Cited

U.S. PATENT DOCUMENTS

| 5,303,344 A * | 4/1994 | Yokoyama et al. ............ 709/230 |
| 6,272,109 B1 * | 8/2001 | Pei et al. ........................ 370/230 |
| 6,452,915 B1 | 9/2002 | Jorgensen |
| 6,690,719 B1 * | 2/2004 | Raphaeli et al. .............. 375/222 |
| 6,738,371 B1 * | 5/2004 | Ayres ............................ 370/352 |
| 6,930,987 B1 * | 8/2005 | Fukuda et al. ................. 370/328 |
| 2003/0074445 A1 * | 4/2003 | Roach et al. ................... 709/224 |
| 2003/0206559 A1 * | 11/2003 | Trachewsky et al. ......... 370/509 |
| 2005/0094581 A1 * | 5/2005 | Giloi et al. ..................... 370/260 |

OTHER PUBLICATIONS

U.S. International Searching Authority, "International Search Report", cited in corresponding International Patent Application No. PCT/US04/20714, dated Feb. 25, 2005, 4 pages.
U.S. International Searching Authority, "Written Opinion of the International Searching Authority", cited in corresponding International Patent Application No. PCT/US04/20714, dated Feb. 25, 2005, 6 pages.

* cited by examiner

*Primary Examiner* — Jianye Wu
*Assistant Examiner* — Wanda Z Russell
(74) *Attorney, Agent, or Firm* — Connolly Bove Lodge & Hutz LLP

(57) ABSTRACT

Methods and apparatus are described for a data link control layer of a communication modem in which data movement functionality is implemented in hardware. In one embodiment, a data link layer comprises software, memory and hardware. The software comprises a processor configured to receive control signaling from a host device and provide control information to the hardware. The hardware comprises an outbound memory manager configured to receive data from the host device, determine locations in the memory for the data, store the data in the memory, determine which of the data is to be forwarded to a physical layer during a given transmit period, and forward the data to the physical layer. In preferred embodiments, the modem is a high performance modem designed for the terminals of a wireless local area network having multiple data flows, segmentation and reassembly, encryption, automatic repeat request, and quality of service requirements.

35 Claims, 8 Drawing Sheets

DATA LINK CONTROL ARCHITECTURE FOR INTEGRATED CIRCUIT DEVICES

This application claims priority under 35 U.S.C. §119(e) to U.S. Provisional Patent Application No. 60/484,568, filed Jul. 1, 2003, entitled DATA LINK CONTROL (DLC) ARCHITECTURE, which U.S. Provisional Patent Application is incorporated herein by reference.

BACKGROUND OF THE INVENTION

1. Field of the Invention

The present invention relates generally to integrated circuit devices, and more specifically to implementing a data link control layer in an integrated circuit device for transferring and receiving data.

2. Discussion of the Related Art

Wireless modems for communications devices provide a means to format and transport data between a host device and an air interface. Wireless modems typically include a data link control (DLC) layer and a physical (PHY) layer. The DLC layer includes functionality to format the data for transmission over the air interface and to format data received over the air interface to go to the host device, i.e., the DLC controls packet or data movement through the modem. The physical layer (PHY) includes the functionality to transmit and receive the data via the air interface according to the medium access control (MAC) protocol. These layers may be implemented on an integrated circuit device as a combination of hardware and software.

Depending on the application, data packet movement through a modem performed by the DLC layer can include at least one or more of the following features: segmentation and reassembly (SAR), encryption/decryption, automatic repeat request (ARQ), quality of service (QoS) drop policy enforcement, corrupted packet handling, multi-flow data packet management and inter-packet timing preservation between the sender and receiver. It is understood that the more features a modem is designed to have, the modem will have greater performance and increased complexity.

Typically, the DLC layer performs data movement through modem using software for some functions and using hardware for other functions. Dedicated hardware, such as a hardware state machine, is used to perform that functionality that is highly repetitive and not subject to change once the modem design is complete. For example, encryption and decryption are typically performed in hardware. Implementing functionality in hardware can reduce cost and improve system performance, although may increase the design time. On the other hand, functionality that is complex, non-repetitive or subject to change as the modem design matures is implemented in software. For example, software stored in memory (e.g., RAM or ROM) is executed on an embedded general purpose microprocessor in order to implement such functionality. Typically, data movement through the wireless modem requires state maintenance including connection state, keys for encryption, authentication status, wireless channel state, wireless network frequency channel, wireless bandwidth reservations, current data queue occupancy and QoS statistics. In applications where the host device is designed to communicate with many different devices, such as a wireless access point of a wireless local area network, algorithms needed to maintain this state information are constantly subject to change. This is because the modem will connect to various host devices and each host device may want to use the modem in a slightly different manner. Another reason is that at the early stages of a modem design process, it is virtually impossible to predict all of the conditions that a wireless terminal will face. For these reasons and others, it is required that the algorithms that perform data movement and modem state maintenance are contained in software, e.g., adaptable code running on an embedded general purpose microprocessor.

SUMMARY OF THE INVENTION

The invention provides a data link control layer of a modem in which functionality traditionally implemented in software is implemented in hardware.

In one embodiment, the invention can be characterized as a data link layer of a modem comprising a software portion, a memory and a hardware portion. The software portion comprises a processor configured to receive control signaling from a host device and provide control information to the hardware portion. The hardware portion comprises an outbound memory manager configured to receive data from the host device that is destined for a physical layer, determine locations in the memory for the data, store the data in the memory, determine which of the data is to be forwarded to the physical layer during a given transmit period, and forward the data to the physical layer.

In another embodiment, the invention can be characterized as a method of moving data through a data link control layer of a modem, the data link control layer having a hardware portion and a software portion, the method comprising the steps of: receiving, in the hardware portion, data from a host device that is destined for a physical layer; determining, in the hardware portion, locations in memory to store the data; storing, in the hardware portion, the data in the locations of the memory; determining, in the hardware portion, which of the data is to be forwarded to the physical layer during a given transmit period; and forwarding, in the hardware portion, the data to the physical layer.

In a further embodiment, the invention may be characterized as a data link layer of a modem comprising a software portion, a memory and a hardware portion. The software portion comprises a processor configured to receive control signaling from a physical layer via a hardware portion and provide control information to the hardware portion and a host device. The hardware portion comprises an inbound memory manager configured to receive data cells destined for the host device from the physical layer, determine locations in the memory to store the data cells, store the data cells in the memory, reassemble the data cells into data packets and forward the data packets to the host device.

In yet another embodiment, the invention may be characterized as a method of moving data through a data link control layer of a modem, the data link control layer having a hardware portion and a software portion, the method comprising the steps of: receiving, in the hardware portion, data cells from a physical layer, the data cells destined for a host device; determining, in the hardware portion, locations in memory to store the data cells; storing, in the hardware portion, the data cells in the locations of the memory; determining, in the hardware portion, which ones of the data cells may be reassembled into data packets; reassembling, in the hardware portion, the ones of the data cells into the data packets; and forwarding, in the hardware portion, the data packets to the host device.

BRIEF DESCRIPTION OF THE DRAWINGS

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION

Figure 1:
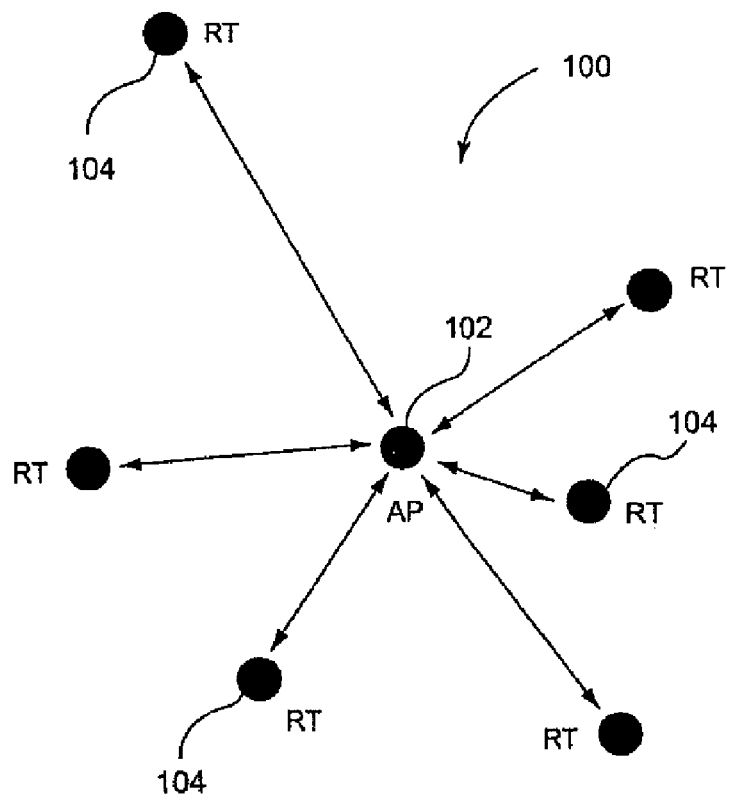
FIG. 1 is a network diagram of the topology of a wireless local area network (LAN) including a wireless access point and multiple remote terminals, each device having a wireless modem that facilitates the transfer of data to and from its host device to other devices in the network.

The following description is not to be taken in a limiting sense, but is made merely for the purpose of describing the general principles of the preferred embodiments. The scope of the invention should be determined with reference to the claims.

According to several embodiments of the invention, a data link layer architecture of a wireless modem is described that implements functionality in hardware that is traditionally performed in software. Thus, it is useful to generally describe hardware and software and their differences. As known in the art, software is considered to be the combination of a general purpose hardware state machine, referred to as a processor, and a collection of arbitrary instructions contained in some form of memory (e.g., RAM or ROM). The processor reads instructions from a location in this memory and performs operations as a result of these instructions. This operations include, but are not limited to, reading from memory, writing to memory, performing arithmetic operations on values contained in memory, and branching to different locations in memory for subsequent instruction reads. It is understood that with software, changes to the instructions that reside in memory will substantially change the functionality of the software system. Changes to the instructions, for example, can change a software system from a video game into an accounting spreadsheet application.

As known in the art, hardware is considered to be a specific hardware state machine, e.g., an application specific integrated circuit (ASIC). This state machine has one primary function, however that function may be quite broad. A hardware state machine may be programmable either through some form of instructions or re-configurable register inputs. This programmability, however, does not alter the essential function of the hardware state machine. An example of a programmable/configurable hardware state machine that still has a specific function is a direct memory access (DMA) machine. DMAs are typically used to move memory from one location to another at high speeds. A DMA is typically programmed through a series of register writes as to the start address of the memory to be moved, the destination address, and the quantity of bytes to be moved. Many advanced DMAs allow for series values to be programmed simultaneously and for these values to actually be pointers to locations in memory which actually contain the information needed to program the DMA. Despite all of this programmability, a DMA still has one primary function and is therefore considered hardware. Some hardware state machines start out as general purpose processors and then are reduced to a specific purpose processor by removing the functionality not needed for a particular task. These state machines are still programmable, however once the general purpose functionality is removed, they can only accomplish very limited functions. Thus, these state machines are considered to be hardware state machines. The reason for starting from a general purpose processor and then reducing functionality is that this is a design methodology which offers a quick design cycle.

Thus, as generally used throughout this disclosure, the functionality of software may be readily changed by altering the instructions running on the hardware state machine, whereas the core functionality of hardware can not be changed even though it may respond differently to different inputs.

Furthermore, software (i.e., the combination of code in memory and a general purpose hardware state machine) consumes more power than hardware on an integrated circuit. However, hardware is more time consuming and difficult to design and it's function generally can not be changed once implemented.

Referring first to FIG. 1, a network diagram is shown of the topology of a wireless local area network (LAN) 100 (referred to generically as a wireless network or simply a network 100) including a wireless access point 102 (also referred to as AP 102) and multiple remote terminals 104 (also referred to as RTs 104), each device having a wireless modem that facilitates the transfer of data to and from its host device to other devices in the network. In this topology, wireless AP 102 couples the network 100 to a larger computer network via a wireless or wireless connection. Thus, the AP 102 functions as a portal or gateway to the larger network. In one implementation, the AP 102 is located at a user's residence and provides access to a cable network/internet. For example, voice, video and/or data are delivered to and from the network 100 via the AP 102. In this embodiment, the RTs 104 each communicate with the AP 102 in a star topology, although it is understood that the network 100 may have a different topology, e.g., a mesh topology in which each RT 104 can wirelessly communicate with the AP 102 and directly with other RTs 104.

Each communication device (i.e., the AP 102 and the RTs 104) of FIG. 1 includes a wireless modem and is coupled to a host device. For example, in a residential setting, the AP 102 comprises a set top box that couples to the larger network, while the host devices coupled to the RTs 104 may comprise a television, a personal computer, a mobile computer, a computer peripheral (such as a printer), a telephone, an appliance, a game system, etc. In other applications, the network may be a wireless hot spot or access point for any communicating devices within the range of the network 102 to access the network and use its services. For example, a user with a mobile computer device may enter the network as an RT 104 and wirelessly access the Internet via the AP 102. Such wireless networks are commonly indoor and/or outdoor networks.

In preferred embodiments, a wireless modem and its DLC are designed for a time division multiple access/time division duplex (TDMA/TDD) system communicating using a multi-carrier modulation scheme, such as orthogonal frequency division multiplexed (OFDM) communications, e.g., communications based upon the IEEE 802.11a standard. It is understood that the apparatus and techniques provided herein may be applied to transmission schemes and to other single carrier or multi-carrier modulations. Furthermore, it is understood that the modems presented herein may be configured to transmit and receive data to and from a wired, wireless (guided and/or free space) or optical (e.g., guided and/or free space) transmission channel.

Figure 2:
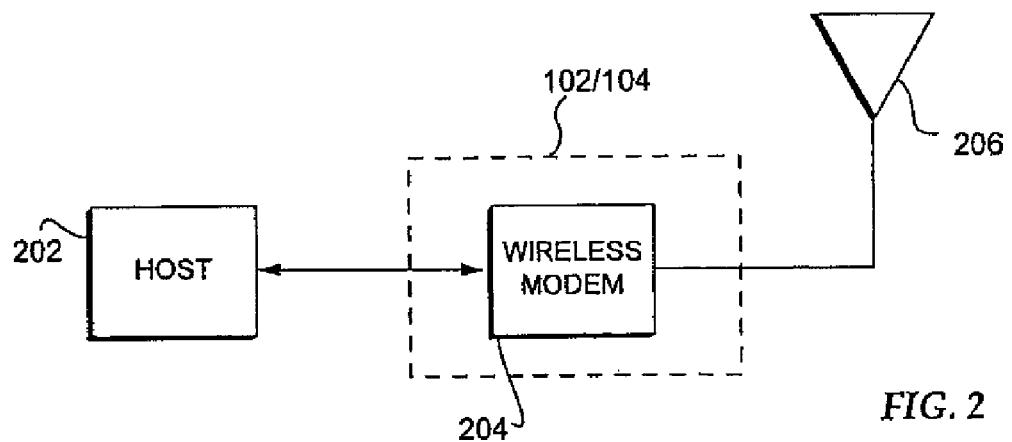
FIG. 2 is a block diagram of an access point or a remote terminal including a host device coupled to a wireless modem.

FIG. 2 illustrates a simple diagram of a host device 202 coupled to a wireless modem 204 of a terminal 102/104 having an antenna 206. Although the host device 202 is illustrated as separate from the wireless modem 204, it is understood that the wireless modem may be integrated into the host device 202. As described above, the host device 202 may be any number of devices, each potentially using the wireless modem in a slightly different way. The wireless modem 204 facilitates the transfer of data to and from the host device 202 to other devices in the network. The AP 102 and the RTs 104 of FIG. 1 may include both the host device 202 and the wireless modem 204 or may include the wireless modem 204 without the host device 202 (as illustrated in FIG. 2). It is also noted that depending on the specific type of transmission channel, the antenna 206 may be replaced by any suitable signal transmitting and receiving means, such as a laser diode.

Figure 3:
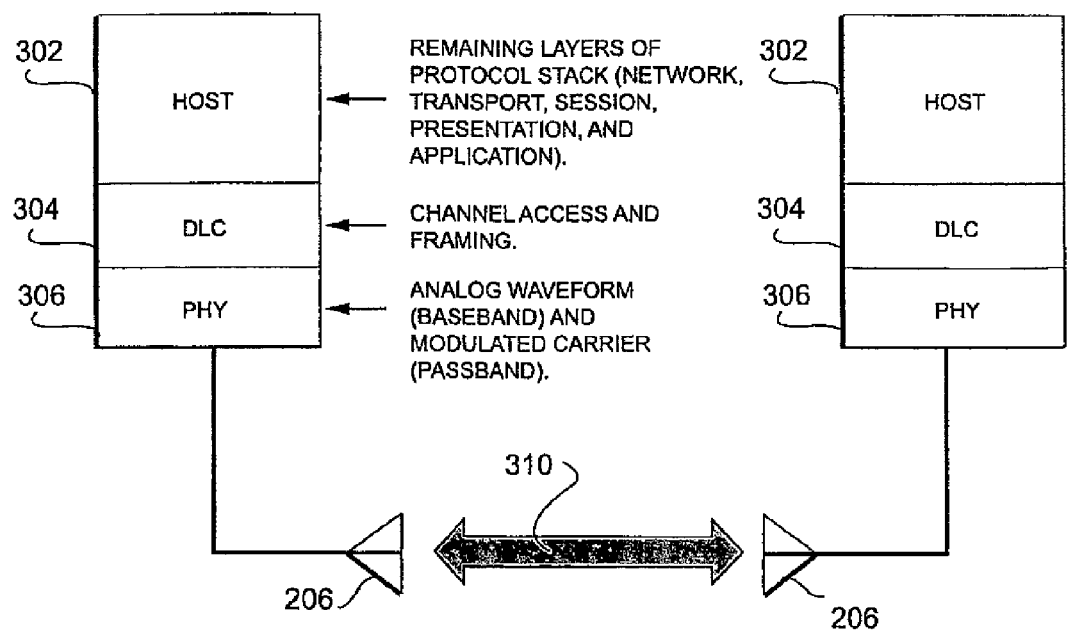
FIG. 3 is a layering diagram for the wireless modems of two communicating devices.

Referring next to FIG. 3, a layering diagram is shown for the wireless modems of two communicating devices. In this diagram, a host layer 302 functions to interface between the wireless modem and the host device. It includes such layers as, network, session, presentation and application layers. The DLC layer 304 includes the channel access and framing layers. Thus, the DLC layer formats the data for transmission over the Physical (PHY) layer 306. The PHY layer 306 includes the functionality to create and waveform for transmission, including the baseband and passband. The PHY layer 306 is coupled to antenna 206, which transmits and receives signaling via the wireless communication link 310. In wireless systems, the PHY layer 306 is considered as an unreliable pipe to be manipulated by the DLC layer 304 so as to, among other things, make it reliable, synchronize the transmissions and receptions as needed by the medium access control (MAC) protocol, and multiplex control and data bearing packets through it.

In the context of a wireless local area network 100, wireless modem design is very complex. In many embodiments, the modem 202 must not only move data at high speeds but it must also perform state maintenance, such as whether the modem is connected, configured properly, authenticated properly, etc. Some functions that the modem must perform are repetitive and not subject to change once the modem design is complete. To reduce cost and improve system performance, these tasks should be done in dedicated hardware. Some functions are non-repetitive and may change well after the modem design is complete. These tasks should be done in embedded software and should be made available to the hardware through software upgrades.

Furthermore, according to several embodiments, it is highly desirable to have only a single embedded microprocessor, i.e., a general purpose hardware state machine, in the wireless modem 202. An embedded processor is costly, both in terms of money and power consumption. Usually, general purpose microprocessors have a per unit royalty associated therewith that increases the overall cost of the modem higher. Also, since the microprocessors are general purpose processors, they are in general less power efficient than dedicated hardware state machines.

Wireless modems 202 have burdens placed upon them that wire-line modems do not. If a wireless modem is connection oriented (such as the wireless modems in the network 100 of FIG. 1), the wireless modem must maintain much state information within it. This state information includes, but is not limited to, connection state, secret keys for encryption, authentication status, wireless channel state, wireless network frequency channel, wireless bandwidth reservations, current data queue occupancy, and quality of service (QoS) statistics. This state information is particularly large when implemented at the AP 102 of the network 100, since the AP 102 needs to maintain links with all wireless RTs 104, whereas each RT 104 only has to maintain information for its link with the AP 102. The algorithms needed to maintain this state information are constantly subject to change for many reasons. One reason is that since the modem will connect to various hosts as described above, each host device 204 may want to use the modem in a slightly different manner. Another reason is that at the early stages of a modem design process it is virtually impossible to predict all of the conditions that a wireless RT 104 will face. As the design becomes more mature, these conditions are known better, however if the modem design is done in an ASIC, many times the design must be frozen long before this maturity is reached. For these reasons and others, in preferred embodiments, the algorithms that perform this modem state maintenance are contained in software and be performed by an embedded general purpose microprocessor.

In several embodiments, a high performance wireless modem is designed that should be capable of sending and receiving data at very high speeds. This implies that data packet management must be done at high speed. Since the microprocessors are general purpose, they are, in general, not well equipped to move data packets through a modem at high speeds. In preferred embodiments, in a system according to IEEE 802.11a, data packet travel should occur at about 54 Mbps through the wireless modem. Although data packet movement is a repetitive process, in the context of wireless modems where packets are subject to channel errors, these processes are not necessarily simple. Thus, according to several embodiments of the invention, dedicated hardware state machines handle data packet movement in the wireless modem 202.

Data packet movement through a wireless modem is composed of, but not limited to, one or more of the following functions; segmentation, segmentation and reassembly (SAR), encryption/decryption, selective repeat automatic repeat request (ARQ), quality of service (QoS) packet drop policy enforcement, corrupted packet handling (i.e., handling packets with errors), multi-flow data packet management, and inter-packet timing preservation between sender and receiver. According to several embodiments of the invention, the DLC layer 304 performs one or more of these tasks in dedicated hardware, and most preferably, all of these tasks.

The need for segmentation arises when the DLC layer is synchronous. This task can be done by the host device or the DLC, however when the bit rate of the wireless modem 204 is very high, it is very difficult for the host device 202 to perform this task. Some modems perform segmentation without reassembly. These modems leave it to the receiving host device to perform reassembly. Again, if the bit rates are high, this is difficult for the host device to do.

Encryption and decryption occur on the packets as they leave the DLC layer 304 and enter the PHY layer 306 on the outbound path and leave the PHY layer 306 to enter the DLC layer 304 in the inbound path. Since encryption is a high speed XOR operation, it is traditionally implemented in dedicated hardware.

Selective repeat automatic repeat request (SR-ARQ) is the most efficient form of ARQ in terms of channel bandwidth used. It amounts to high-speed memory (data packet) management and is very complex, however repetitive and deterministic. QoS packet drop policy enforcement is also high-speed memory management. It to is complex yet repetitive and deterministic.

Allowing for reception of packets containing channel errors allows for higher throughput for applications that can tolerate bit errors in packets. Allowing packets containing errors presents many challenges in wireless modem design as the packets themselves contain information needed by the receiver to perform memory management and reassembly and if this information is corrupted, the receiver can become confused. This process is Complex yet repetitive and deterministic.

Inter-packet timing preservation (IPTP) is an operation by which packets emerge from the receiving modem into the host device 202 with inter-packet times identical to those when the same packets arrived from the host device to the modem at the transmitting terminal. It is virtually impossible to accomplish this process with anything other than a dedicated hardware state machine as the typical tolerances for IPTP jitter is on the order of tens of nanoseconds.

Furthermore, the complexity of the wireless modem 204 increases further when the modem has the ability to perform data packet movement for more than one flow. A flow is a sequence of packets which have sequential dependence on one-another, originate from the same source, and/or carry a common information stream. For example, a wireless modem 204 at the AP 102 may be simultaneously handling data packet movement for two different flows, one flow comprising a video stream from the AP to a television and another flow comprising data downloaded from the internet from the AP to a computer.

It is noted that the wireless communication link 310 may be any wired, wireless or optical communication link; however, in preferred embodiments, it is a wireless radio frequency communication link.

Figure 4:
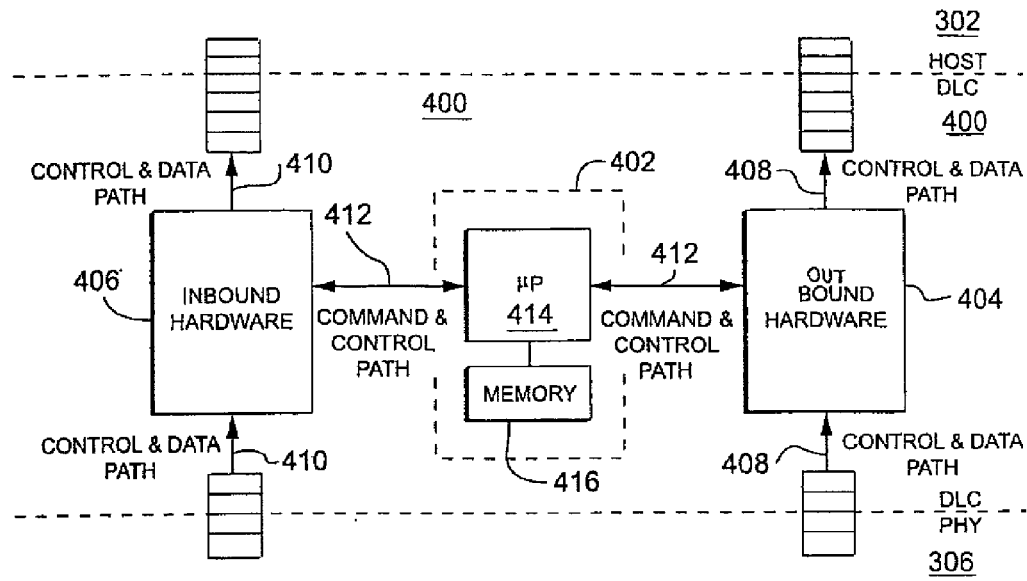
FIG. 4 is a diagram of the architecture of a data link layer of a wireless modem including a software portion and a hardware portion, the architecture viewed as hardware in accordance with one embodiment of the invention.

Referring next to FIG. 4, a diagram is shown of the architecture of a data link layer 400 of a wireless modem including a software portion and a hardware portion, the architecture viewed as hardware in accordance with one embodiment of the invention. Illustrated are a software portion 402, an outbound hardware portion 404 (also referred to as the outbound hardware state machine) and an inbound hardware portion 406 (also referred to as the inbound hardware state machine). Also shown are the outbound control and data path 408 from the host 302 to the PHY 306, the inbound control and data path 410 from the PHY 306 to the host 302, and the command and control paths 412 to and from the software portion 402 and the respective hardware portions 404, 406. The software portion includes an imbedded general purpose processor 414 (also referred to as a general purpose hardware state machine or processor 414) and memory 416 which is used by the processor 414 for the storage of instruction code and program data.

Advantageously, in this embodiment, the DLC 400 includes only one embedded general purpose processor. The processor executes programmable instructions stored in the memory 416 and functions to perform all modem state maintenance and related air interface/network interface protocol signaling. The embedded processor 414 also performs MAC functions as well as controls the dedicated hardware portions 404, 406. As illustrated, the outbound direction is from the Host to the DLC to the PHY while the inbound direction is from the PHY to the DLC to the Host. The outbound path 408 can be thought of a transmit path and the inbound path 410 as a receive path.

In operation, the outbound data and control packets enter the outbound hardware portion 404 from the host. The software portion 402 receives control packets from the host via the outbound hardware portion 404. The software portion 402 controls the outbound hardware portion 404 via an outbound command interface (OCI). This control is necessary for the software portion 402 to perform its MAC functions. Control signaling that originates from the processor 414 destined for the air interface is passed by the processor 414 to the outbound hardware portion 404 using an outbound control field interface (OCFI). The data packets received by the outbound hardware portion 404 from the Host will be temporarily placed in internal memory that is addressable by the hardware state machine/s within the outbound hardware portion 404.

Data packets emerging from the channel by way of the PHY layer will be received in the inbound hardware portion 406. The inbound hardware portion 406 passes control fields to the software portion 402 for interpretation, provided that the fields are addressed to the particular terminal. Data packets are taken into internal memory that is addressable by hardware state machines of the inbound hardware portion 406. The hardware state machine/s of the inbound hardware portion 406 are programmable by the processor 414 as well as by other hardware state machines by using an inbound command interface (ICI). This programming is needed to implement MAC functions. The data packets taken into internal memory are eventually reassembled into host packets and forwarded on to the Host by inbound hardware portion 406. Control packets that originate from the processor 414 that are destined for the Host will be passed by the processor 414 to the inbound hardware portion 406 by way of an Inbound Control Packet Interface (ICPI).

It is noted that the inbound hardware portion 406 and the outbound hardware portion 404 both use internal memory, which may be common with the memory 416 utilized by the processor 414. For example, in one embodiment, the inbound and outbound hardware portions use separate memories, while in another embodiment, they share the memory 416. Sharing memory is a highly desirable feature as it reduces cost and allows for flexible and optimal memory use.

According to one embodiment, the operation of a DLC operates as follows. The Host sends both control and data packets to the outbound hardware portion 404 of the DLC of the modem, the control packets parsed to the software portion. The outbound hardware portion 404 segments the data packets into fixed length cells. The outbound hardware portion 404 forwards control fields from the software portion 402 to the PHY 306. Based on information from the software portion 402, the outbound hardware portion buffers data cells and determines which data cells to forward to the PHY 306 for transmission over the wireless channel. Over the air interface, control fields and data cells are transmitted. At the receiving terminal, the inbound hardware portion 406 receives and parses these control fields and data cells. The inbound hardware portion 406 buffers the data cells and reassembles the data cells into data packets for delivery to the Host, while the processor (software) processes the control fields addressed to it. Some of these control fields will become control packets to be forwarded to the Host by the inbound hardware portion 406.

Figure 5:
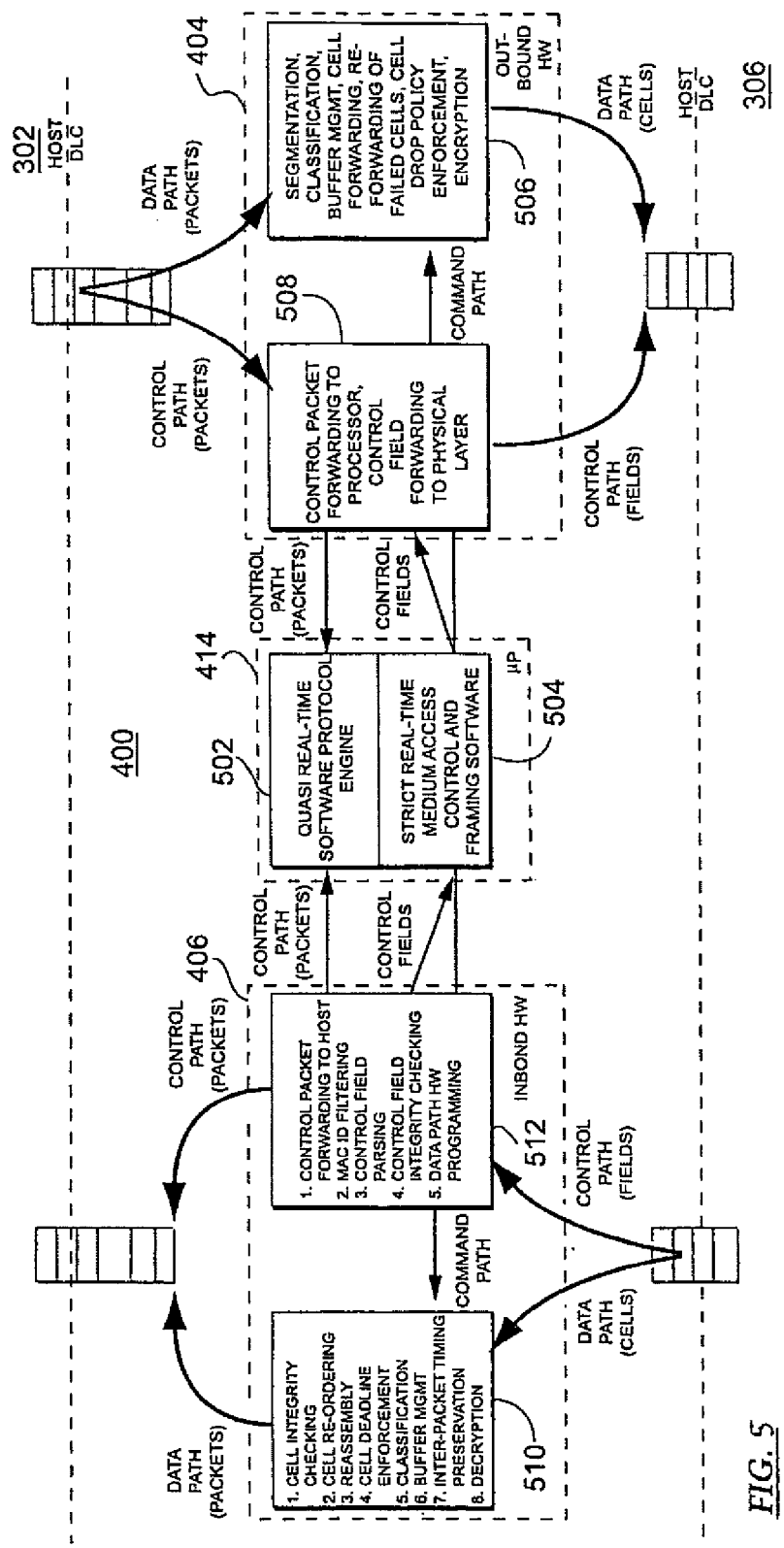
FIG. 5 is a functional representation of one embodiment of the architecture of FIG. 4.

Referring next to FIG. 5, a functional representation is shown of one embodiment of the architecture of FIG. 4. Data packets and control packets from the host arrive into the outbound hardware portion 404.

In this embodiment, the code or a set of instructions that run on the processor 414 encompasses two domains. The first domain is the quasi real-time (QRT) domain 502. In this domain 502, the processor 414 receives and sends messages from the Host and performs modem state maintenance. The second domain is the strict real-time (SRT) domain 504. In the SRT domain 504, the processor 414 controls both the inbound hardware portion 406 and the outbound hardware portion 404 and operates the PHY layer in a very time precise manner. This is to accomplish MAC functions.

On the outbound side, in this embodiment, the outbound hardware portion 404 includes a data path portion 506 that performs the following functionality: segmentation of packets into cells; packet classification; buffer management; cell forwarding under processor command; buffering, re-ordering and re-forwarding of failed cells; dropping cells based upon QoS drop policy; and encryption under processor command. Furthermore, a control path portion 508 of the outbound hardware portion 404 performs the following functionality: control packet forwarding to the processor; and control field forwarding to the PHY layer. Thus, the outbound hardware portion 404 outputs control fields and data cells to the PHY layer. Control packets flow from the host to the quasi real-time domain 502 via the control path portion 508. Control fields flow from the strict real-time domain 504 to the PHY via the control path portion 508. Furthermore, a command path is provided from the strict real-time domain 504 to the data path portion 506.

On the inbound side, data cells and control fields from the PHY layer arrive into the inbound hardware portion 406. In this embodiment, the inbound hardware portion 406 includes a data path portion 510 that performs the following functionality: data cell integrity checking; cell re-ordering; reassembly; cell deadline enforcement/QoS drop policy; cell classification; buffer management; inter-packet timing preservation; and decryption. Furthermore, a control path portion 512 of the inbound hardware portion 406 performs the following functionality: MAC Identification filtering; control field parsing; control field integrity checking; programming of inbound hardware state machines; and control packet forwarding to the host. Thus, the inbound hardware portion 406 outputs control packets and data packets to the host. Control fields flow from the PHY to the strict real-time domain 504 via the control path portion 512. Control packets flow from the control path portion 512 to the quasi real-time domain 502. Furthermore, a command path is provided from the strict real-time domain 504 to the data path portion 510.

Figure 6:
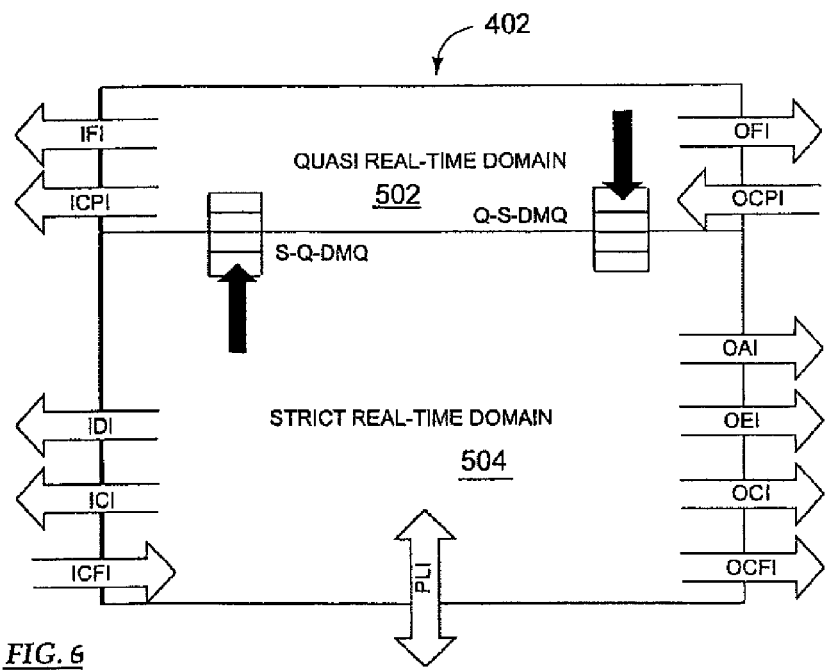
FIG. 6 is a functional representation of the software portion and it's interfaces with the hardware portions in the architecture of FIGS. 4 and 5.

Referring next to FIG. 6, a functional representation is shown of the software portion and its interfaces with the hardware portions in the architecture of FIGS. 4 and 5. The software portion 402 includes the quasi real-time (QRT) domain 502 and the strict real-time (SRT) domain 504. The reason for this is that some functions of the processor 414 require extremely precise complete times while others do not. Some examples are as follows. In one embodiment, setting up MAC framing is be done at an exact instant in time. If this is not done, the modem will not synchronize properly and data may be lost. To authenticate, digital certificates are often exchanged. There is no strict requirement for this operation to complete in a timely manner, rather it is driven by an "inconvenience factor" that a product developer must discern.

One way of accomplishing this domain splitting is for the functions that fall into the QRT domain 502 be performed within a real-time operating system (RTOS) while the SRT domain 504 functions are performed when processor interrupts are received. The RTOS operates on time scales proportional to operating system clock ticks, which can be made arbitrarily large, and the RTOS can be interrupted by signals arriving from the hardware state machines of the hardware portions 404 and 406 giving control of the processor 414 to the SRT domain 504 functions.

For the purposes of clarity, the software functions that reside in the QRT domain 502 are called threads where as the software functions that reside in the SRT domain 504 are called service routines.

The data link layer 400 outlined in FIGS. 4 and 5 is designed such that all functions that can possibly be performed in the QRT domain 502, will be done in the QRT domain 502. The reason for this is two fold. First, if an RTOS is employed in the QRT domain 502, it provides resources that otherwise would need to be reinvented in the SRT domain. Second, if an RTOS is employed, it can time slice between multiple processes. This allows for a "graceful degradation" to occur as the processing requirements increase.

SRT domain service routines are engaged either by other SRT domain service routines or by interrupts received by the hardware state machines of the inbound hardware portion 406, the outbound hardware portion 404 or the PHY 306. As such, FIG. 6 illustrates how the two domains interface between each other and how they interface with the hardware state machines. It is noted that FIG. 6 is a functional representation and that many of the interfaces can be implemented using the same hardware/software mechanism.

The interfaces for the flow of control information are now described. The Outbound Control Packet Interface (OCPI) routes host control packets received from the Host to threads running on the processor 414. The Outbound Control Field Interface (OCFI) provides a means for service routines in the SRT domain 504 to send control fields out to the air interface. The generation of control fields needs to reside in the SRT domain 504 as these fields are sent out with strict timing requirements. Many control fields are essential to perform MAC functions. The Inbound Control Packet Interface (ICPI) allows threads running on the processor 414 to send control messages to the Host. These control messages will typically originate from threads in the QRT domain 502. It is possible that inbound control fields received from the PHY to the SRT domain 504 will be forwarded to the QRT domain 502 for eventual delivery to the Host. This forwarding will occur across the SRT-QRT domain message queue (S-Q-DMQ). The Inbound Control Field Interface (ICFI) provides a means for control fields received by hardware state machines of the inbound hardware portion 406 from the PHY 306 to be passed to service routines in the processor. These control fields often times require immediate attention to facilitate MAC functions. If these fields are not processed in a timely manner, data loss can occur. Some control fields will be passed into the QRT domain 502 via the S-Q-DMQ.

According to this embodiment, all control information is routed through the processor 414. This allows for flexibility, even though some operations on the control information are simple and repetitive. Take as an example, the reception of an automatic repeat request (ARQ) bit map. When a receiving DLC receives this information, it will arrive as a control field from the PHY 306 to DLC 400 via the ICFI. A service routine will write this bit map to the Outbound ARQ Interface (OAI), which is described more below. Even though this is a simple operation, allowing the processor 414 to perform it allows for other information to be "piggy backed" onto the ARQ control field that the processor could possibly use for other features.

The interfaces for programming the hardware state machines of the outbound hardware portion 404 and the inbound hardware portion 406 are now described. The Outbound ARQ Interface (OAI) provides a means for a service routine to program the outbound hardware portion 404 with an ARQ bit map. The Outbound Encryption Interface (OEI) provides a means for a service routine to update the encryption keys and initialization vectors used by encryption hardware state machines. The Outbound Command Interface (OCI) allows for a service routine to issue commands to the outbound hardware portion 404 to forward cells contained in internal memory to the PHY 306. This command will indicate what flow the cells belong to and the quantity of cells to be forwarded. The Inbound Decryption Interface (IDI) provides a means for a service routine running on the processor to change decryption keys and initialization vectors in the decryption hardware state machines. The Inbound Command Interface (ICI) provides a means for a service routine running on the processor 414 to issue commands to program the inbound hardware portion 406 to receive data cells and control fields from the PHY 306. These commands will indicate the type of control field or number of data cells that the inbound hardware portion 406 should expect to receive.

The Physical Layer Interface (PLI) is a bi-directional interface used by service routines running on the processor 414 to configure the PHY layer 306 to either transmit or receive data. From processor to PHY, the PLI consists of commands. These commands will configure when to turn on the PHY, select a PHY waveform, select a PHY coding scheme, indicate a byte count, and provide antenna selection information. This is not an exhaustive list of items needed to control the PHY. Different types of PHYs may require additional command information.

The Outbound Flow Interface (OFI) and the Inbound Flow Interface (IFI) are interfaces for flow configuration. The OFI allows threads to configure the outbound hardware portion 404 to receive data packets from the Host and allow these packets to be segmented and routed to memory dedicated to a particular flow. The commands issued on the OFI will either register a flow or release a flow. When a flow is registered in outbound hardware portion 404, state information needed for outbound hardware portion 404 to properly manage data cells is initialized. This state information includes pointers to memory where cells are to be stored, counts of the number of cells present in memory, pointers to cells that need to be retransmitted, and QoS parameters associated with the flow. When a flow is released by a command to the OFI, this state information is nullified.

The Inbound Flow Interface (IFI) allows threads to configure the inbound hardware portion 406 to receive data cells from the PHY 306 and allow these packets to be classified and routed to memory dedicated to a particular flow. The commands issued on the IFI will either register a flow or release a flow. When a flow is registered in the inbound hardware portion 406, state information needed for the inbound hardware portion 406 to properly manage data cells is initialized. This state information includes pointers to memory where cells are to be stored, counts of the number of cells present in memory, counters that indicated how long cells have been kept in memory, and QoS parameters associated with the flow. When a flow is released by a command to the IFI, this state information is nullified.

According to one embodiment, the strict real time domain 504 performs several functions or service routines as described below. A service routine takes input values and computes cell forwarding commands. These commands will then be issued to the outbound hardware portion 404 via the OCI. These commands are issued prior to a deadline. This deadline is the final time by which commands to the OCI will produce data cells in time for the PHY to pull them. In one embodiment, it is essential that this functionality reside in the SRT domain because these forwarding commands are to be received in a timely manner. If this is not done, the PHY will begin to pull data from the DLC when the DLC has no data to provide it. Thus, the service routine is a scheduling routine. The inputs to this scheduling routine can be requests for bandwidth from RTs, in the case where the DLC resides at an access point (AP) of the network, or the inputs can be from the output of a scheduling algorithm, as would be the case if the DLC resides at a remote terminal (RT) of the network.

Also provided are service routines that take input values and generate control fields to be sent to the outbound hardware portion via the OCFI. These control fields are for MAC functions, ARQ, and generic control signaling. The generation of control fields needs to reside in the SRT domain 504 as these fields are sent out with strict timing requirements. If the DLC resides in an AP of the network, a service routine will issue control fields to establish MAC timing. For both AP and RT, a service routine will receive an ARQ bit map from inbound hardware portion 406 via the OCFI, encapsulate this in a control field, and issue this control field to the outbound hardware portion 404 via the OCFI.

Another service routine of the SRT domain 504 takes an ARQ control field received via the ICFI from the PHY 306, extracts the ARQ bit map, and programs the outbound hardware portion 404 with this bit map using the OAI. In one embodiment, it is essential that this functionality reside in the SRT domain 504 because the ARQ bit map must be programmed in a timely manner to insure that successfully received cells are discarded and failed cells are re-ordered for retransmission.

A service routine, using inputs and system parameters, determines when encryption keys and initialization vectors need to be updated. When this time arises, this service routine will issue updated initialization vectors and encryption keys to the outbound hardware portion 404 via the OEI. In one embodiment, it is essential that this functionality reside in the SRT domain 504 because when swapping encryption keys and initialization vectors, the sender and receiver are to be perfectly synchronized or there will be data loss.

A service routine, using inputs and system parameters, determines when decryption keys and initialization vectors need to be updated. When this time arises, this service routine will issue updated initialization vectors and decryption keys to the inbound hardware portion 406 via the IDI. In one embodiment, it is essential that this functionality reside in the SRT domain 504 because when swapping decryption keys and initialization vectors, the sender and receiver must be perfectly synchronized or there will be data loss.

Another service routine issues commands to the ICI to program the inbound hardware portions to receive both control fields and data cells. The service routine will generate these commands based upon inputs. These inputs will come from the output of a scheduling routine if the service routine resides in a DLC which resides in an AP. These inputs will come from control fields arriving to the DLC via the ICFI if the service routine resides in a DLC which resides in an RT. In one embodiment, it is essential that this functionality reside in the SRT domain 504 because these reception commands are to be received in a timely manner. If this is not done, the PHY will begin to push data into the DLC and the DLC will not know how to parse this data.

Another service routine receives control fields arriving from the PHY 306 via the ICFI. These control fields will be either control fields used for MAC functions, control fields containing ARQ bit maps, or generic control signaling. This service routine will take the control signaling pertaining to MAC functions and pass them to the service routine which programs the inbound hardware portion 406 via the ICI. This service routine takes ARQ control fields and passes them to the service routine which programs outbound hardware portion 404 via the OAI. This service routine passes the generic control field signaling either to threads via the S-Q-DMQ or to other service routines.

A further service routine, using the PLI, programs the PHY 306 for either transmit or receive. This service routine generates commands to configure when to turn on the PHY, select a PHY waveform, select a PHY coding scheme, indicate a byte count, and provide antenna selection information. This is not an exhaustive list of items needed to control the PHY. Different types of PHYs may require additional command information. To generate these commands, the service routine will use inputs. These inputs will come from the output of a scheduling routine if the service routine resides in a DLC which resides in an AP. These inputs will come from control fields arriving to the DLC via the ICFI if the service routine resides in a DLC which resides in an RT.

Many of the service routines of the SRT domain 504 can be either combined or subdivided without loss of generality. For instance, the service routine which takes control fields from the ICFI could actually have several subroutines, each subroutine dedicated to a particular type of control field. In this manner, the subroutine which receives ARQ control fields can be the same service routine which programs the ARQ bit map to the outbound hardware portion 404 via the OAI.

According to one embodiment, the quasi real time (QRT) domain 504 performs several software functions or threads as described below. A thread receives control packets from the Host via the OCPI. These control packets can be deleted, passed to other threads, acted upon, or passed into the SRT domain 504 via the QRT-SRT domain message queue (Q-S-DMQ). Another thread registers or releases flows using commands issued to the OFI. Since flow establishment and flow tear down is typically not that time sensitive, these functions are performed by threads that reside in the QRT domain 502. Another thread registers or releases flows using commands issued to the IFI. Since flow establishment and flow tear down is typically not that time sensitive, these functions are performed by threads that reside in the QRT domain 502. All remaining software functions reside in the QRT domain 502. These include but are not limited to dynamic frequency selection, power control, combined PHY mode and power control, dynamic bandwidth scheduling, connection admission control, security functions, and authentication.

Figure 7:
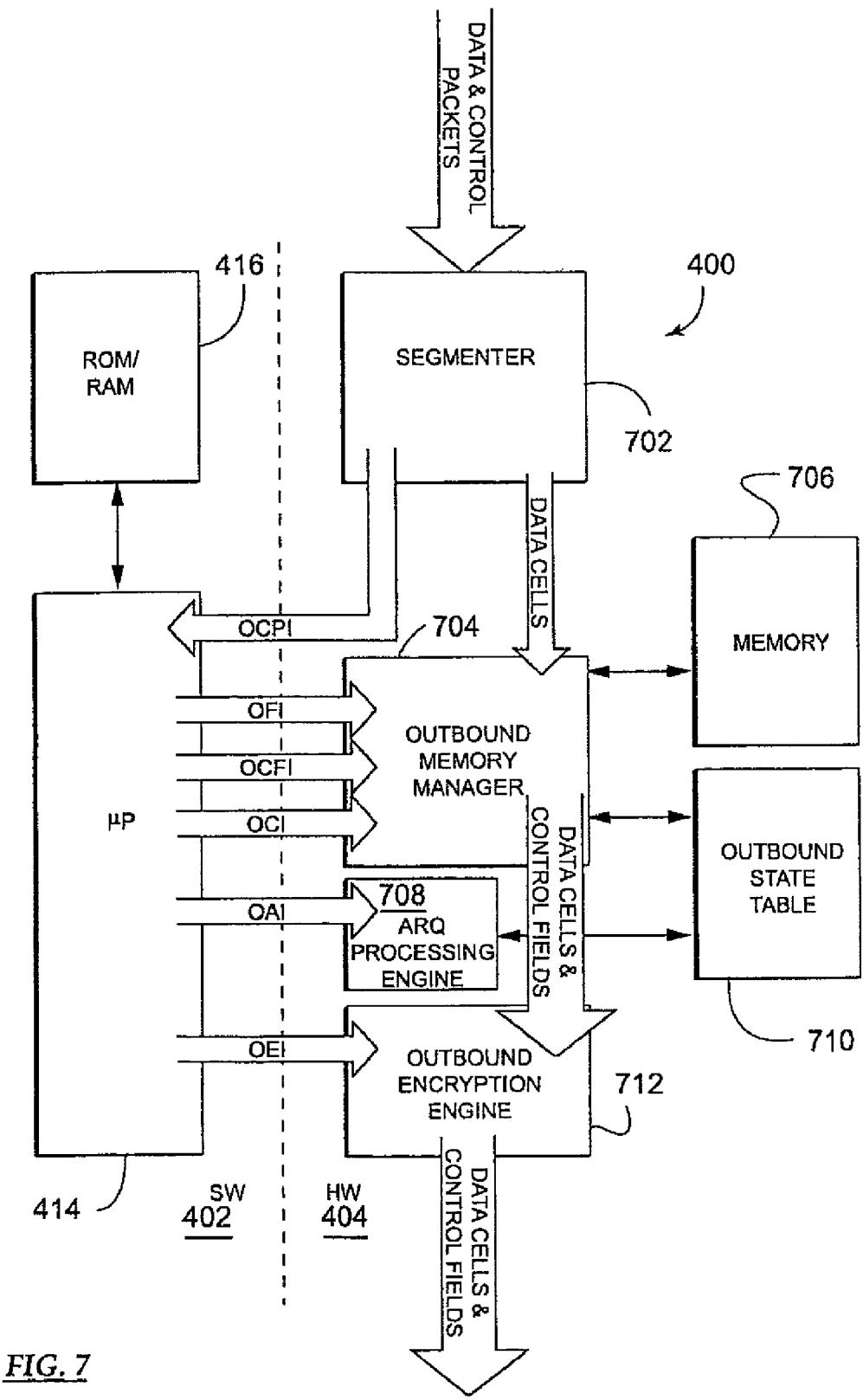
FIG. 7 is a diagram of the architecture of one embodiment of the outbound subsystem of the architecture of FIG. 4.

Referring next to FIG. 7, shown is a diagram of the architecture of one embodiment of the outbound subsystem of the architecture of FIG. 4. Illustrated are the software portion 402 and the outbound hardware portion 404. The software portion 402 includes the processor 414 and the 416. The outbound hardware portion 404 includes a segmenter 702, an outbound memory manager (OMM) 704, a memory 706, an ARQ processing engine 708, an outbound state table 710 and an outbound encryption engine 712. Also shown are the various interfaces between the software portion 402 and the outbound hardware portion 404, including the Outbound Control Packet Interface (OCPI), the Outbound Flow Interface (OFI), the Outbound Control Field Interface (OCFI), The Outbound Command Interface (OCI), the Outbound ARQ Interface (OAI), and the Outbound Encryption Interface (OEI).

According to this embodiment, the segmenter 702 receives both control and data packets from the Host 302, forwards the control packets to the processor 414 via the OCPI, and segments data packets into fixed sized cells. The outbound memory manager (OMM) 704 takes cells from the segmenter 702 and places them in the memory 706. It is noted that the memory 706 is illustrated as a memory separate from memory 416; however, it is understood that this memory 706 may be common to both the outbound hardware portion 404 and the processor 414 to reduce cost. Under commands issued by the processor 414 across the OCI, the OMM 704 forwards cells from memory 706 to the outbound encryption engine 712. Under commands issued by the processor 414 across the OCFI, the OMM 704 forwards control fields from the processor 414 to the outbound encryption engine 712. The ARQ processing engine 708 receives an ARQ bit map from the processor 414 via the OAI and uses this ARQ bit map to ready for retransmission, those cells which failed to be received at their destination. The processor 414 uses commands issued to the OMM 704 via the OFI to register and release flows. The outbound encryption engine 712 uses keys and initialization vectors received from the processor 414 via the OEI to encrypt data cells and control fields received from the OMM 704. The outbound state table 710 contains state variables used by the OMM 704 and the ARQ processing engine 708 for memory management.

In the preferred embodiment, the segmenter 702 receives both data and control packets from the Host. For example, both data and control packets have a FLAGS field in a known location. The segmenter 702 parses the FLAGS field from this location. If the FLAGS field indicates the packet is a control packet, it is passed to the processor 414 via the OCPI. In the preferred embodiment, the OPCI consists of a first in, first out (FIFO) dual port memory unit with an interrupt signal to the processor 414. If the FLAGS field indicates that the packet is a data packet, it is parsed again for the PAYLOAD_LENGTH field and the flow identifier (FID) field. The PAYLOAD_LENGTH and FID field are in know locations within the data packet. The segmenter 702 then fragments the data packet into fixed sized cells (CELL_LENGTH). The number of data cells that arise from a data packet is given in Equation 1. If there are remaining bytes in a cell payload, these bytes are padded with a known sequence.

$$\text{cells} = \left\lceil \frac{\text{PAYLOAD\_LENGTH}}{\text{CELL\_LENGTH}} \right\rceil \qquad \text{Equation 1}$$

The interface from the segmenter 702 to the OMM 704 is preferably a FIFO. When the segmenter 702 places a cell into this FIFO, it includes a header. This header contains, among other things, the FID and the segmentation status (SAR_STATUS). The SAR_STATUS field can take on the following values: SAR_START; SAR_MIDDLE; SAR_END; and SAR_NOT_PRESENT.

In a preferred embodiment, the segmenter 702 coordinates with the OMM 704 to perform buffer overflow management, in other words, if the cells segmented from a given packet will not fit into the memory, then the packet is simply dropped and not segmented to conserve resources. For example, when a packet arrives at the segmenter 702, the segmenter 702 determines the number of cells C that will result from the packet if it is segmented. The segmenter 702 can determine this value by one of two ways. If the packet contains a header which indicates the length of the packet, this length can be used to compute C using Equation 1. If the packets are of a known length and the packets don't contain a header field indicating the length, this length can be read from a hardware register or memory and then C is computed again using Equation 1. The segmenter 702 then determines to which flow the packet belongs. This is done by reading a field in the packet and from this field, determine which flow the packet belongs to. This field can be a flow identifier (FID) or some other value that can be translated into a FID. The segmenter 702 then passes the FID and the cell count C to the OMM 704. The OMM 704 then uses the FID to find the flow's state information in the OST 710. Once this is done, the OMM 704 uses the flow information in the OST 710 to determine if the packet in its entirety can be accommodated into the memory set aside for this flow. It basically determines if there is room for C cells within the memory set aside for this flow. If the packet can be accommodated, the OMM 704 signals the segmenter 702 to begin the segmentation process after which the segmented cells will be forwarded to the OMM 704. If the packet cannot be accommodated in its entirety, the OMM 704 signals the segmenter 702 to discard this packet and consider others. Using this technique, packets which have no possibility of being reassembled at the receiver are discarded at the transmitter. This preserves bandwidth on the channel connecting the two modems.

The outbound state table (OST) 710 contains the state information needed to perform multi-flow memory management and selective repeat ARQ. In the preferred embodiment, the OST 710 is simply a linear table in register memory with the number of table entries equal to the maximum number of concurrent flows. It could be, however, implemented using a cache/hash table combination. This would be the preferred implementation if the number of flows were large to the point that a linear search through a table was to time consuming or the linear table size poorly utilized register memory space. It should also be noted that the OST 710 can be implemented in any form of memory. The contents of the OST include FID, READ_INDEX, WRITE_INDEX, PENDING_INDEX, CELLS_IN_MEMORY, and NEXT_SEQUENCE_NUMBER.

In the preferred embodiment, the OMM 704 pulls data cells from the segmenter 702 to memory 706 and forwards cells from memory 706 to the outbound encryption engine 712. When a data cell is ready at the segmenter 702, the OMM 704 reads the FID, performs a linear search of the OST 710 to find the entry that matches the FID, and then transfers the cell from the segmenter FIFO to a memory address indicated by the WRITE_INDEX. The WRITE_INDEX is subsequently incremented. Thus, the OMM 704 determines the location in memory to store the data cells, stores the data cells in memory and updates the OST with these locations.

When a cell is moved to memory 706, a cell header is added. This header consists of the following fields; SAR_STATUS, SEQUENCE_NUM, CELL_STATUS, TTL, and FID. The SAR_STATUS field is taken from the header added to the cell by the segmenter 702. The SEQUENCE_NUM field is generated by reading the NEXT_SEQUENCE_NUMBER in the OST 710. Upon placing the cell in memory 706, the OMM 704 increments NEXT_SEQUENCE_NUMBER. The CELL_STATUS is set to OCCUPIED. The time-to-live (TTL) of a particular cell (i.e., the maximum number of ARQ re-transmit attempts before the packet is dropped) is set to a value consistent with the QoS the cells should receive. The FID is read from either the OST 710 entry or from the header added to the cell by the segmenter 702 as they are the same.

In the preferred embodiment, the OCI and the OCFI are implemented in the same hardware memory register (FIFO). The commands written to the OCI/OCFI have a FLAGS field in a known location that takes on a value of CELL or CONTROL. If the command reads CONTROL, it will include, among other things, a LENGTH field. The OMM 704 reads LENGTH bytes from the OCI/OCFI FIFO and passes this on to the outbound encryption engine 712. When the FLAGS field reads CELL, it will include, among other things, a FID field and a QUANTITY field. The OMM 704 then reads QUANTITY cells from the flow FID and forwards them on to the outbound encryption engine 712. These cells are located by performing a linear search through the OST 710, concluding the search when the FIDs match. When performing this forwarding operation, the OMM 704 pulls cells from memory 706 pointed to either by the READ_INDEX field, subsequently decrementing it, or pointed to by entries in the Pending Cell FIFO (PCF). Entries in the PCF have, among other things, a CELL_INDEX index pointing to a cell in memory 706 that needs to be retransmitted. There is one PCF for each flow. The PCF to read from is the one with the same index as the index into the OST 710 where all of the flow state can be found. Thus, based on QoS information from the software portion (e.g., how many cells for each flow should be transmitted during a given transmit period), the OMM 704 determines which data cells to forward during each transmit period and forwards the data cells.

In the preferred embodiment, when the OMM 704 forwards a cell, it places an entry in the Previous Frame FIFO (PFF). An entry in the PFF has, among other things, a CELL_INDEX and a FLOW_INDEX. The CELL_INDEX field is either the READ_INDEX, if the cell was forwarded from the location pointed to by the READ_INDEX field in the OST 710, or the CELL_INDEX of a PCF entry, if the cell was forwarded based upon a PCF entry. The FLOW_INDEX is the index into the OST 710 where all of the flow state can be found. The DUMMY_CELL_INDICATOR is set to valid if the cell is a dummy cell.

The forwarding done in the preferred embodiment uses a linear search through the OST 710 to match FID entries. Another way of accomplishing this is with a cache/hash table combination. The OST 710 could actually be a hash table. When initially performing a FID match search, the OMM 704 would access a cache table. The search through the cache table would be linear. If a match is found, the cache table would point to an index in the hash table (OST) that contained all the flow state. If no match is found in the cache table, a hash function would then be employed to find an initial index into the hash table. The OMM 704 would go to this index in the hash table to see if FIDs match. If no match is found, a search operation is then employed in the hash table until the FIDs match. This would be the preferred implementation if the number of flows was large to the point that a linear search through a table was to time consuming or the linear table size poorly utilized register memory space.

In the preferred embodiment, the OFI is a series of registers that the processor 414 can write to and the OMM 704 can read from. The value that needs to be written to register a flow is the FID. Other values can be written but are not essential. When a flow is registered (e.g., when a virtual queue is set up in memory for data cells belonging to the flow to be stored or buffered), the OMM 704 will select a location in the OST 710 for the flow state information to reside. The entry in the OST 710 selected will have FID set to the FID arriving by the OFI. The remaining fields in the OST entry (READ_INDEX, WRITE_INDEX, PENDING_INDEX, CELLS_IN_MEMORY, and NEXT_SEQUENCE_NUMBER) will be set to zero. A flow is released by the OMM 704 when the processor 414 writes a FID to the OFI. The OMM 704 will find this FID in the OST 710 and remove that entry from the OST 710.

In the preferred embodiment, the ARQ processing engine 708 begins operation upon receiving an ARQ bit map via the OAI. The OAI is simply a register that the processor 414 can write to and the ARQ processing engine 708 can read from. The ARQ processing engine 708 takes this bit map and matches it up bit-for-entry with the previous frame FIFO (PFF).

According to one embodiment, if the bit in the bit map indicates the cell was properly received, the ARQ processing engine 708 will:

1. Set the CELL_STATUS of the cell pointed to by the CELL_INDEX to EMPTY
2. If the PENDING_INDEX of the OST 710 is identical to this PFF entry's CELL_INDEX then decrement the PENDING_INDEX until either:
   a. it points to a cell who's CELL_STATUS is equal to PENDING
   b. is equal to the READ_INDEX
3. Discard this entry in the PFF.

If the bit in the bit map indicates that cell was not properly received, the ARQ processing engine 708 will decrement the TTL (time-to-live) field. If this field becomes zero, then follow the steps listed above as if the cell was properly received. If the TTL is greater than zero, then:

1. Set the CELL_STATUS to PENDING
2. Generate a PCF entry with CELL_INDEX equal to the CELL_INDEX of this PFF entry
3. Add this PCF entry to the FLOW_INDEX$^{th}$ PCF.

Accordingly, in one embodiment, no matter how many flows the DLC 400 is capable of supporting, there need be only one previous flow FIFO (PFF). For each flow the DLC 400 is capable of supporting, there needs to be a pending cell FIFO (PCF).

The outbound encryption engine 712 simply receives cells or control fields and encrypts them using keys and initialization vectors supplied by the processor 414 using the OEI. In the preferred embodiment, the OEI is simply a set of registers that the processor can write to and to which the outbound encryption engine 712 can read from.

It is noted that the outbound hardware portion 404 comprises one or more hardware state machines. For example, the segmenter 702, the OMM 704, the ARQ processing engine 708 and the outbound encryption engine 712 are each hardware state machines. It is also noted that one hardware state machine may contain the functionality of more than one of the hardware modules shown in FIG. 7. It is also noted that there can be other hardware state machines in the outbound hardware portion 404 that are not described in detail in this disclosure. For example, additional hardware state machines can include cyclic redundancy check sequence generation modules, forward error correction modules, and buffering modules. They can be inserted throughout the architecture illustrated in FIG. 7 without any loss of generality.

The outbound hardware portion 404 is in contrast to known DLCs in that much of the functionality normally performed in software is performed in hardware. For example, the functionality of cell forwarding, buffer management, re-forwarding of failed cells and cell drop policy enforcement are performed in hardware. Such functionality is typically performed in software in known modem designs in order to maintain flexibility. According to several embodiments, the software portion 402 provides information to the outbound hardware portion about the quality of service of data flows and ARQ information, and the hardware, i.e., the OMM 704 and the ARQ processing engine 708 determine which cells to send to the PHY for transmission. It is noted that in one embodiment, the ARQ processing engine 708 is part of the OMM 704. In one embodiment, the OMM 704 includes a direct memory access (DMA); however, it is the OMM 704 that controls the DMA, not the software. In contrast, in known modems, the software will control such a DMA and instruct the DMA, which cells to forward for transmission. According to several embodiments of the invention, the OMM itself decides which cells to forward to the PHY and instructs the DMA accordingly.

As can be seen in FIG. 7, the entire data path from the host to the PHY is implemented in hardware. That is, hardware performs the functionality to move data from the host to the PHY. This is in contrast to known modem designs in which software performs most of the functionality of data movement.

Figure 8:
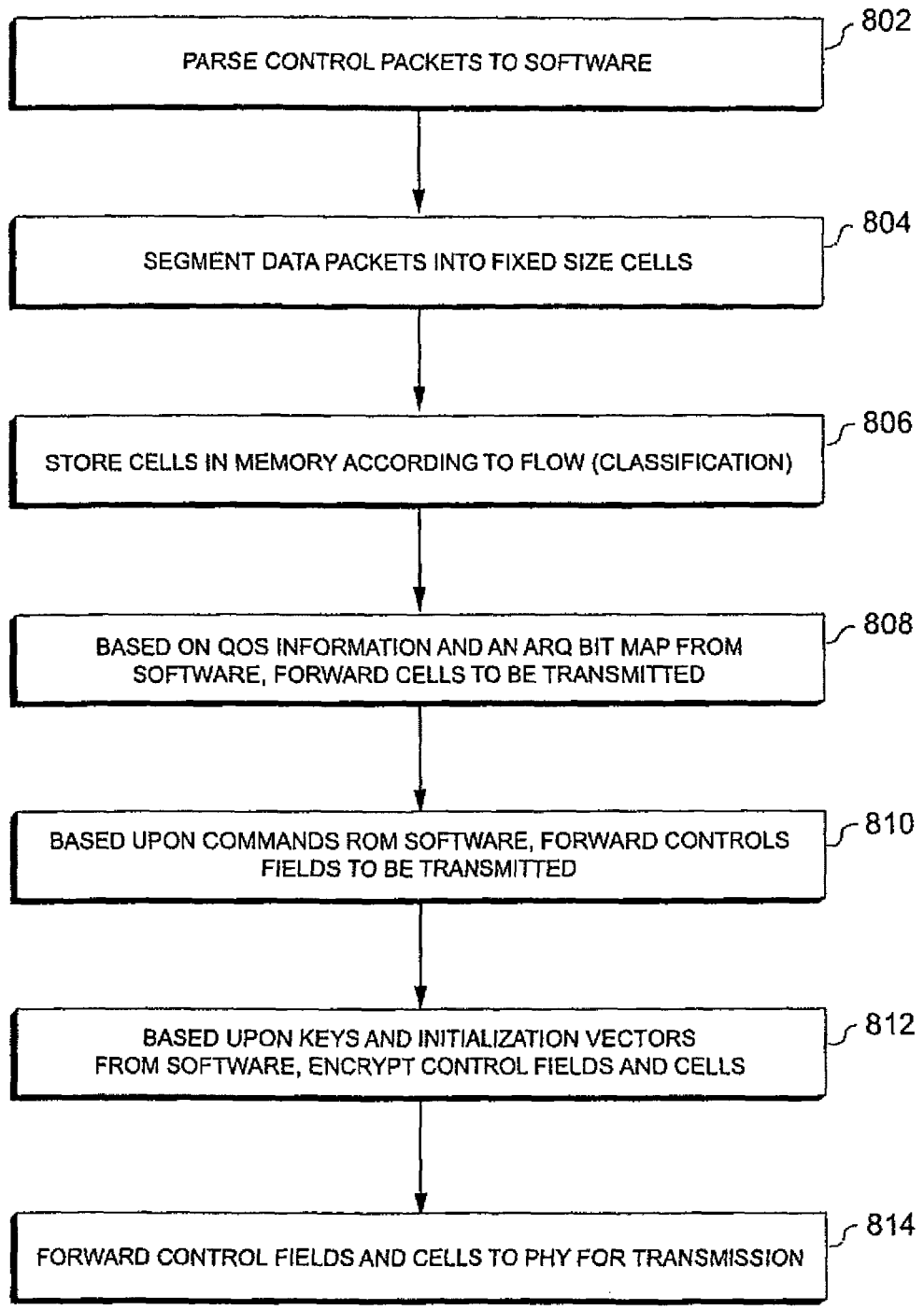
FIG. 8 is a flowchart of the steps performed by the outbound hardware portion of FIG. 7 according to one embodiment of the invention.

Referring next to FIG. 8, a flowchart is shown of the steps performed by the outbound hardware portion 404 according to one embodiment of the invention. The DLC receives control and data packets and parses the control packets to the software portion 402 (Step 802). Next the data packets are segmented into fixed length data cells (Step 804). Steps 802 and 804 may be performed by the segmenter 702 of FIG. 7, for example. It is noted that in some embodiments, the segmenting step is not required if the data packets that are received are already in the form of fixed length cells. Thus, the segmenter 702 as illustrated in FIG. 7 may simply be a parser, parsing the control packets to the software portion. It is also noted that in preferred embodiments, packets are discarded at the segmenter 702 if they will have too many cells for the memory available once segmented. Thus, such packets are discarded, not segmented. This functionality is referred to as buffer overflow management. In preferred embodiment, this buffer overflow management includes some coordination between the OMM 704 and the segmenter 702 as described above.

Next, the data cells are stored in memory according to flow (Step 806). This is performed, for example, by the OMM 704 of FIG. 7. Based on instructions from the software portion regarding the existence of flows, the cells are classified as belonging to a particular flow and cells belonging to the same flow are stored in memory (e.g., in a virtual queue) together. The OMM determines the locations in memory to store the data cells, moves the data cells to those locations in the memory, and updates the state information contained in the OST 710 for the flow.

In preferred embodiments, in order to store the cells in memory with multiple flows, the outbound hardware portion first registers and/or releases flows. The software portion 402 instructs that the hardware portion 404 register or release the flow, but the hardware portion 404 actually performs it. For example, in one embodiment, the software portion 402 instructs the OMM 704 to register 3 flows and release a flow no longer in use. It is noted that while the software has instructed this, the OMM 704 itself actually registers and releases the flows. The OMM 704 registers each flow by finding a virtual FIFO in memory, deleting the old contents and setting up state information in the OST 710. The flow is registered and the memory is ready for cells to be stored for the given flow. Thus, the OMM 704 determines the locations in memory for the virtual queues. In contrast, in a conventional modem, the software will determine the locations in memory perform these steps, not the hardware. In order to release a flow, the state information contained in the OST 710 is nullified and the virtual queue in memory becomes available for another flow. It is noted that the step of registering and/or releasing one or more flows can occur at any time prior to actually storing the cells and in preferred embodiments where the segmenter performs buffer overflow management, it occurs prior to segmenting (Step 804).

Next, based upon quality of service (QoS) information and automatic repeat request (ARQ) information received from software, the cells to be transmitted are forwarded (Step 808). For example, the software provides QoS information about the flows and the outbound hardware portion decides which cells to forward. For example, if there are 3 flows, the software portion will instruct the OMM 704 to transmit 5 cells for Flow A, 3 cells for Flow B, and 8 cells for Flow C each given transmit period (e.g., MAC frame). The OMM 704 uses this information to then determine which 5 cells from Flow A to forward to the PHY, which 3 cells to forward for Flow B, and which 8 cells to forward for Flow C. The OMM 704 also considers the ARQ information, e.g., presented to the outbound hardware portion in an ARQ bit map that indicates which previously transmitted cells failed and should be re-transmitted. Thus, the OMM 704 uses the ARQ information to re-order and drop pending cells. In one embodiment, the ARQ bit map is sent to the ARQ processing engine 708. Thus, when deciding which 5 cells to forward in Flow A, the OMM 704 looks first to see if there are any failed cells that need to be re-transmitted (e.g., in a pending cell FIFO (PCF)), and then to the virtual FIFO in memory 706 for the particular flow. The hardware portion also implements the drop cell policy for cells. For example, if the maximum number of re-transmit attempts is set at 3 (time-to-live=3), the hardware portion deletes the cell if it has been re-transmitted 3 times and failed.

Thus, advantageously, the QoS algorithm is implemented in the software portion to maintain flexibility; however, the repetitive but complex process of moving cells around is done in hardware. This is particularly, important where the software portion 402 is responsible for multiple tasks. For example, in the embodiment of FIG. 4, the communication system is preferably a time division multiple access/time division duplex transmission scheme in a wireless local area network in which transmit and receive occur during the same frame. Although, technically, transmit and receive occur at different times during the frame, a processor must get information ready to transmit prior to it being transmitted. Thus, the processor would be performing transmit and receive functionality at the same time. Since a processor can only perform one step at a time, and due to stringent timing requirements, multiple processors would be required. However, according to several embodiments of the invention, much of the functionality traditionally performed in software is performed in dedicated hardware. Thus, in preferred embodiments, a data link control layer is implemented with a single embedded processor and dedicated hardware.

Next, based on commands from the software, control fields to be transmitted are forwarded (Step 810). Next, based upon encryption keys and initialization vectors received from the software, the control fields and data cells are encrypted (Step 812). The encrypted control fields and data cells are then forwarded to the PHY for transmission (Step 814). It is noted that preferably data cells are not actually forwarded to the PHY, i.e., pointers to locations in memory when the data cells are stored are forwarded and the PHY actually pulls the cells from those location in memory. However, it is understood that when referring to the DLC forwarding cells herein, this includes forwarding the pointers in memory to those cells.

Figure 9:
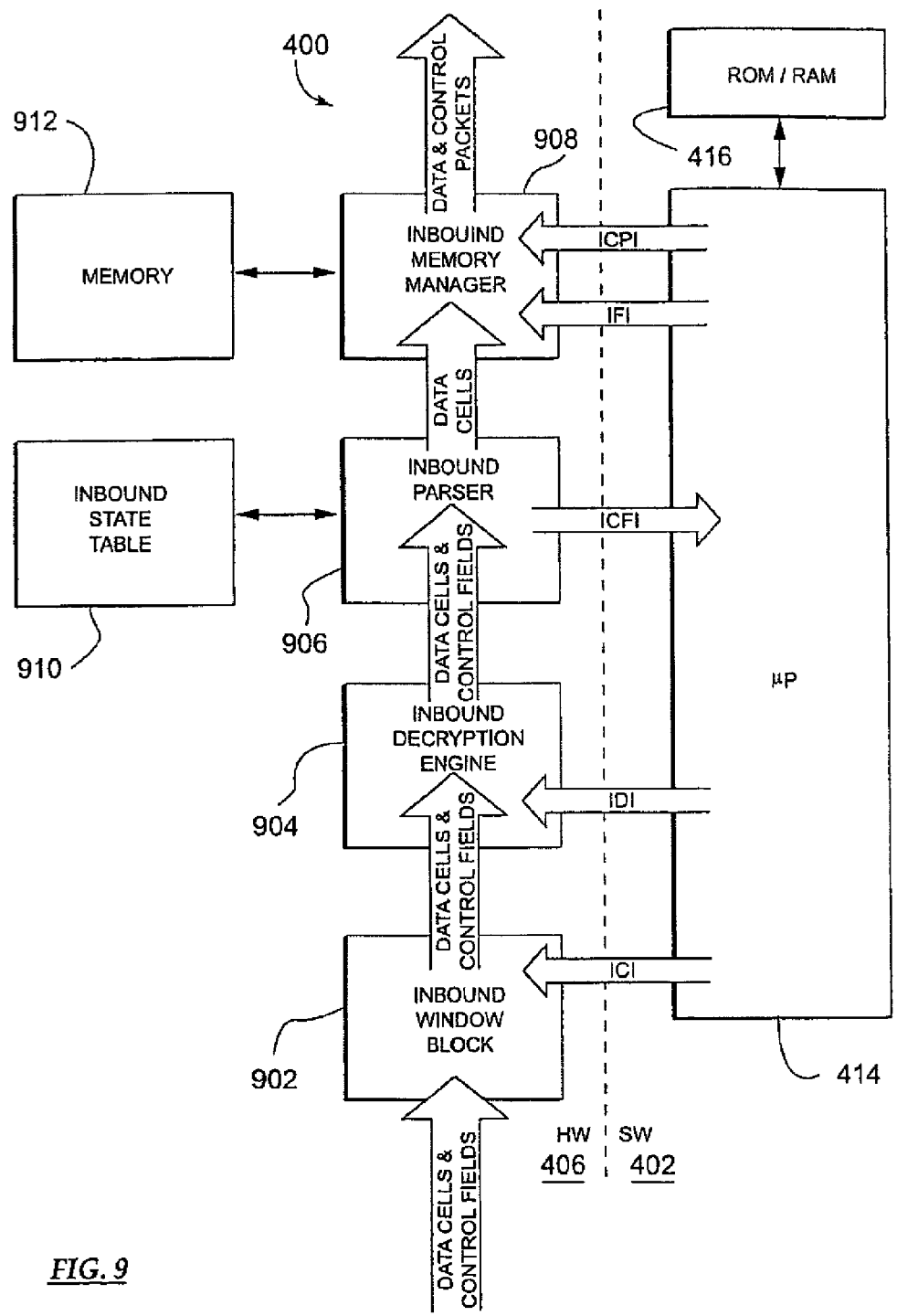
FIG. 9 is a diagram of the architecture of one embodiment of the inbound subsystem of the architecture of FIG. 4.

Referring next to FIG. 9, shown is a diagram of the architecture of one embodiment of the inbound subsystem of the architecture of FIG. 4. Illustrated are the software portion 402 and the inbound hardware portion 406. The software portion 402 includes the processor 414 and the 416. The inbound hardware portion 406 includes an inbound window block (IWB) 902, an inbound decryption engine (IDE) 904, an inbound parser (IP) 906, an inbound memory manager (IMM) 908, a memory 912 and inbound state table (IST) 910. Also shown are the various interfaces between the software portion 402 and the inbound hardware portion 406, including the Inbound Control Field Interface (ICFI), the Inbound Command Interface (ICI), the Inbound Decryption Interface (IDI), and the Inbound Flow Interface (IFI) and the Inbound Control Packet Interface (ICPI).

According to one embodiment, the inbound window block (IWB) 902 receives control fields and data cells from the PHY 306 and performs a window operation on the arriving sequence. This window operation is performed under the command of the processor 414 via the ICI. This arriving sequence is then passed to the inbound decryption engine (IDE) 904 along with a control signal from the IWB 902 indicating the type of sequence that is arriving. The IDE 904 will decrypt the arriving sequence and pass the decrypted sequence of control fields and data cells to the inbound parser (IP) 906. The IP 906 parses the arriving sequence, passing the control fields to the processor 414, via the ICFI, while passing the data cells to the Inbound Memory Manager (IMM) 908. The IMM 908 determines locations in memory for the cells and places the cells in memory 912. The IMM 908 also inspects cells for potential reassembly, and reassembles cells into packets. Reassembled packets are forwarded to the Host. It is noted that the memory 912 is illustrated as a memory separate from memory 416; however, it is understood that this memory 912 may be common to both the inbound hardware portion 406 and the processor 414 to reduce cost. The inbound state table (IST) 910 contains state variables used by the IMM 908 for memory management.

The inbound state table (IST) 910 contains the state information needed to perform multi-flow memory management and QoS based packet forwarding. In the preferred embodiment, the IST 910 is simply a linear table in register memory with the number of table entries equal to the maximum number of concurrent flows. It could be, however, implemented using a cache/hash table combination. This could be a preferred implementation if the number of flows was large to the point that a linear search through a table was to time consuming or the linear table size poorly utilized register memory space. It should also be noted that the IST 910 can be implemented in any form of memory. In one embodiment, the contents of the IST 910 include FID, READ_INDEX, MAXIMUM_WAIT_TIME, HEAD_OF_LINE, and END_OF_LINE.

The IWB 902 receives a stream of information from the PHY 306. This information can be classified in terms of bits, bytes, words, etc. In the preferred embodiment, the IWB 902 classifies bytes. The IWB 902 will window the arriving byte stream according to commands received from the processor 414 via the ICI. Commands issued to the ICI include, among other things, the FIELD_TYPE of the arriving bytes. This FIELD_TYPE will indicate the type of control field being received or the quantity of data cells being received. The IWB 902 passes the number of bytes called out by the FIELD_TYPE command to the IDE. In the preferred embodiment, the ICI is implemented by a hardware FIFO, with the processor 414 accessing the write side and the IWB 902 accessing the read side. There are some circumstances when the IP 906 will also access the write side of the ICI FIFO.

The inbound decryption engine (IDE) 904 simply receives cells or control fields and decrypts them using keys and initialization vectors supplied by the processor 414. The processor sends keys and initialization vectors using the IDI. In the preferred embodiment, the IDI is simply a set of registers that the processor 414 can write to and to which the IDE 904 can read from.

In one embodiment, the inbound parser (IP) 906 receives both data cells and control fields from the IDE 904. If the received bytes make up a control field, the IP 906 parses the sub-fields within the control field to, among other things, performs a cyclic redundancy check (CRC), performs MAC ID filtering, and programs the IWB 902, via the ICI, when strict time budgets require a response time lower than the processor provides. Upon parsing the control field, if certain conditions are met, such as the control field is destined for this DLC, the IP 906 encapsulates the control field and passes it to the processor 414 via the ICFI. When received bytes make up a data cell, the IP 906 performs a CRC, and parses various fields from the cell. These fields include SEQUENCE_NUMBER, SAR_STATUS, FID, and DUMMY_CELL_INDICATOR. Once parsed, these fields along with the result of the CRC are presented to the IMM 908. The IP 906 buffers the cell until the IMM 908 takes action on the cell. For each cell the IP 906 receives, it takes the CRC_STATUS (the result of the CRC), and places it into an ARQ bit-map. When the final cell has been received, this ARQ bit-map (which indicates which cells were received properly and which cells were received in error and should be transmitted) is passed to the processor 414 via the ICFI. In the preferred embodiment, the ICFI is implemented by a hardware FIFO, with the IP 906 accessing the write side and the processor 414 accessing the read side.

In the preferred embodiment, when the IP 906 indicates to the inbound memory manager (IMM) 908 that a data cell is present, the IMM 908 takes the parsed fields (SEQUENCE_NUMBER, SAR_STATUS, FID, DUMMY_CELL_INDICATOR, and CRC_STATUS) and decides what to do with the data cell. If the DUMMY_CELL_INDICATOR is valid, the cell is discarded. The IMM 908 uses the FID to locate the entry in the IST 910, which contains the flow state information. This state information, combined with. SEQUENCE_NUMBER, will determine where in memory the cell should be placed. For each flow, the IMM 908 registers the flow in memory, e.g., the IMM 908 creates a virtual queue using memory. The READ_INDEX will indicate which cell is at the head of this virtual queue. The HEAD_OF_LINE indicates the sequence numbers of the cell at the READ_INDEX. The END_OF_LINE field indicates the sequence number of the cell at the end of the virtual queue. When a cell arrives, it is placed after the READ_INDEX according to its sequence number. If its sequence number is greater than END_OF_LINE, it can be placed in memory and then the END_OF_LINE field is updated to this cell's sequence number. Thus, cells are stored in memory according to their sequence. When a cell is placed in memory, the write time (WRITE_TIME) of the cell is included with the cell in memory. In the preferred embodiment, the WRITE_TIME is the MAC frame number in which the cell was received.

The IMM 908 also engages an inspection process on the cells of a flow in order to determine if packets can be reassembled. This inspection process is engaged for a particular flow if the following conditions occur for cells arriving in a given MAC frame:

1. At least one cell with segmentation and reassembly (SAR) status SAR_NOT_PRESENT or SAR_END was placed in memory for the first time; and 2. At least one cell was placed on top of another cell in memory.

When the inspection process is engaged, the IMM 908 scans the cells of given flow in memory 912 looking for either a SAR_STATUS of SAR_NOT_PRESENT, SAR_START-SAR_END, or SAR_START-SAR_MIDDLE . . . -SAR_END. If any of these combinations is found, the cells are reassembled into packets. If the cells contain errors, the IMM 908 will still attempt to form reassembled packets. When the IMM 908 encounters a cell with an error, it will inspect the WRITE_TIME field included with the cell. If the difference between the WRITE_TIME and the current time is greater than the maximum wait time (MAXIMUM_WAIT_TIME) listed in the IST 910, the cell is considered as received, meaning that the transmitter will not retransmit this cell again. If this is the case, the previously described scanning of cells is used to reassemble the packet. In the preferred embodiment, if a packet contains an error, it is flagged so the Host is aware. If the cells containing errors have not exhausted their MAXIMUM_WAIT_TIME, then the inspection process concludes without a packet reassembly. If inter-packet timing preservation (IPTP) is activated, the reassembly process has an additional constraint. In preferred embodiments, not only must the SAR_STATUS indicate a complete packet is present but also the system clock of the IMM 908 must match or exceed the timestamp contained within the packet. This timestamp is added by the OMM 704 in a known location within the packet. If the system clock does not meet or exceed the packet's timestamp, the reassembly process is postponed.

In the preferred embodiment, the IFI is a series of registers that the processor 414 can write to and the IMM 908 can read from. The value that needs to be written to register a flow is the FID. Other values can be written but are not essential. When a flow is registered, the IMM 908 will select a location in the IST 910 for the flow state information to reside. The entry in the IST 910 selected will have FID set to the FID arriving by the IFI. The remaining fields in the IST entry (READ_INDEX, MAXIMUM_WAIT_TIME, HEAD_OF_LINE, and END_OF_LINE) will be set to zero. A flow is released by the IMM 908 when the processor 414 writes a FID to the IFI. The IMM 908 will find this FID in the IST 910 and remove that entry from the IST 910.

The ICPI is a hardware FIFO included in the IMM 908. The processor 414 writes a control packet to this FIFO and it is forwarded to the Host, multiplexed within arriving data packets.

It is noted that the inbound hardware portion 406 comprises one or more hardware state machines. For example, the inbound window block 902, the inbound decryption engine 904, the inbound parser 906, and the IMM 908 are each hardware state machines. It is also noted that there can be other hardware state machines in the inbound hardware portion 406 that are not described in detail in this disclosure. For example, additional hardware state machines can include forward error correction modules, and buffering modules. They can be inserted throughout the architecture illustrated in FIG. 9 without any loss of generality.

The inbound hardware portion 406 is in contrast to known DLCs in that much of the functionality normally performed in software is performed in hardware. For example, the functionality of registering and releasing flows, buffering cells in memory, re-ordering of cells, and reassembling cells into packets are performed in hardware. Such functionality is typically performed in software in known modem designs. For example, a separate processor is used solely for reassembly. According to several embodiments, the software portion 402 provides information to the inbound hardware portion 406 about the number of flows and the number of maximum number of re-transmit attempts for cells of a particular flow, and the hardware, i.e., the IMM 908 registers and releases the flows. For example, the IMM 908 registers a flow by setting aside a virtual queue in memory where cells belonging to a particular flow will be stored, and storing information in the IST 910. Also, for example, the IMM 908 releases a flow by deleting the information in the IST 910 for the flow and making the virtual queue in memory available. Once the flow/s are registered, the IMM 908 buffers, re-orders and reassembles cells into packets according to the maximum re-transmit number. Thus, the IMM 908 maintains the IST 910. In one embodiment, the IMM 908 includes a direct memory access (DMA); however, it is the IMM 908 that controls the DMA, not the software portion. According to several embodiments of the invention, the IMM 908 itself determines which cells at what memory locations, and in which order to reassemble into packets to be forwarded to the Host 302 and instructs the DMA accordingly.

As can be seen in FIG. 9, the entire data path from the PHY to the host is implemented in hardware. That is, hardware performs the functionality to move data from the PHY to the host. This is in contrast to known modems in which software performs most of the functionality of data movement.

Figure 10:
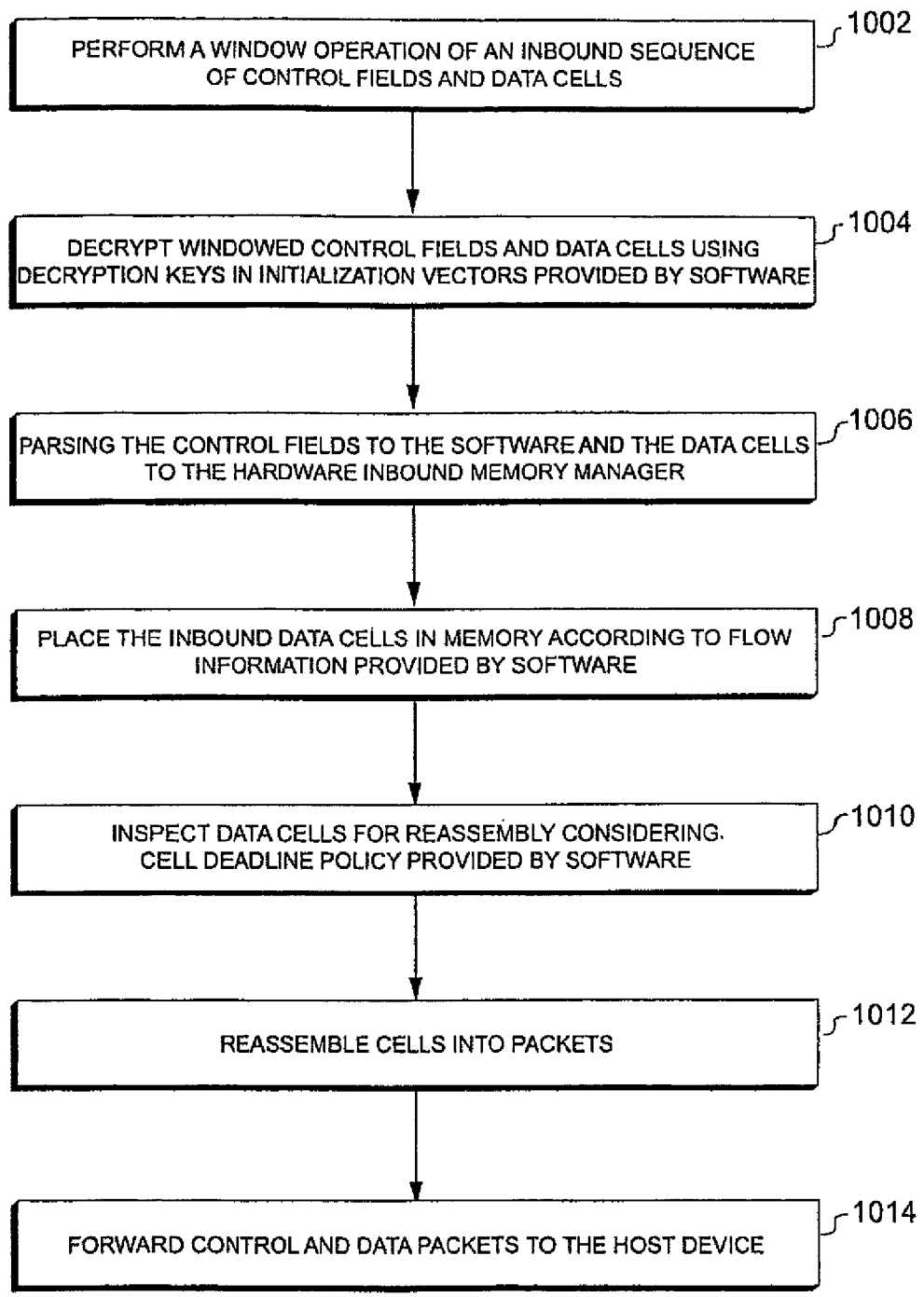
FIG. 10 is a flowchart of the steps performed by the inbound hardware portion of FIG. 9 according to one embodiment of the invention.

Referring next to FIG. 10, a flowchart is shown of the steps performed by the inbound hardware portion 406 according to one embodiment of the invention. The inbound hardware portion of the DLC receives an incoming sequence of control fields and data cells from the PHY 306 and performs a window operation on the sequence (Step 1002). However, it is noted that this is optional in systems where the length of cells and control fields are always the same. Next, the control fields and cells are decrypted using decryption keys and initialization vectors provide by the software portion (Step 1004). Next, the control fields are parsed to the software portion while the data cells are parsed to the inbound memory manager 908 of the inbound hardware portion 406 (Step 1006). It is noted that optionally, prior to the parsing, decoding using forward error correction may be performed on the control fields and data cells.

Next, the data cells are placed into memory 912 by the hardware according to flows per flow information which is provided to the hardware from the software portion (Step 1008). Thus, the hardware portion determines the locations in memory to store the data cells. In preferred form, in order to store the cells when there are multiple flows of cells, the inbound memory manager 908 registers and/or releases flows. For example, the processor 414 provides information about the existence of a number of flows (e.g., 3 flows each having a FID) and the inbound memory manager 908 then sets up a corresponding number of virtual queues in memory 912 (e.g., 3 virtual queues in memory) and stores information about each flow in the IST 910. When releasing a flow, the information in the IST 910 is deleted and the virtual queue is made available. The data cells of like flows are stored in the same virtual queue. In some embodiments, the cells are re-ordered by sequence when stored. The hardware stores and retrieves information about the flows it has registered in the inbound state table 910, which it maintains. This is in contrast to traditional modem design where such functionality is done in software, that is, the software would determine the locations to store cells. According to several embodiments of the invention, the IMM 908 determines the location in memory to store cells for each flow.

Next, the cells are inspected for reassembly considering the cell deadline policy (Step 1010). For example, the hardware scans the cells of a given flow looking for cells that can be reassembled into packets. The cell deadline policy is the maximum number of re-transmit attempts or time-to-live for cells of a given flow. For example, depending on the QoS, the software portion may indicate that cells of Flows A and B have a maximum number of re-transmit attempts of 5 and 3, for example. If one of the cells that could be reassembled is received in error, and there are remaining re-transmit attempts, the cells are not reassembled or are re-assembled with the cells in error flagged for the host.

Next, for cells that may be reassembled, i.e., all cells that make up a given packet are in the memory, the cells are reassembled (Step 1012). Thus, the hardware portion determines which cells to reassemble into packets and thus which cells to forward to the host device. Again, in contrast to traditional modem design, this is performed in hardware, e.g., by the inbound memory manager 908. Traditional modems would have dedicated software for reassembly and memory management. Finally, data packets and control fields are passed to the host device (Step 1014).

Advantageously, the inbound hardware portion 406 performs much of the functionality traditionally implemented in software. This allows fewer embedded processors to be needed in the modem design. Thus, in preferred embodiments, a data link control layer is implemented with a single embedded processor and dedicated hardware that handles data movement through the DLC.

While the invention herein disclosed has been described by means of specific embodiments and applications thereof, numerous modifications and variations could be made thereto by those skilled in the art without departing from the scope of the invention set forth in the claims.

What is claimed is:

1. A wireless modem configured to be paired with a host device, comprising:
    a processor configured to receive control packets from the host device via a hardware portion and provide control information to the hardware portion; and
    a memory;
    the hardware portion comprising:
        an outbound memory manager configured to:
            receive from the host device data that is destined for a physical layer coupled to a wireless medium, the data bypassing the processor, wherein, based on the control information, the outbound memory manager is also configured to:
            determine locations in the memory for the data,
            store the data in the memory,
            determine which of the data is to be forwarded to the physical layer during a given transmit period, and
            forward the data to the physical layer, wherein the outbound memory manager is configured to receive the control information through at least one command interface and at least one control interface; and
        an outbound state table containing state information maintained by the outbound memory manager for the data, said outbound state table configured to maintain state information for multi-flow memory management.

2. The modem of claim 1, wherein the data belongs to one or more of a plurality of data flows, and the outbound memory manager is configured to determine the locations in the memory for the data depending on to which data flow the data belongs.

3. The modem of claim 1, wherein the hardware portion further comprises:
    a segmenter coupled to the outbound memory manager, the segmenter configured to segment data packets received from the host device into data cells and forward the data cells to the outbound memory manager, the data received at the outbound memory manager comprising the data cells.

4. The modem of claim 1, wherein the hardware portion further comprises:
an automatic repeat request processing engine configured to receive an automatic repeat request bit map from the software portion;
wherein the outbound memory manager is configured to determine which data to forward using information in the automatic repeat request bit map.

5. The modem of claim 1, wherein the hardware portion further comprises:
an outbound encryption engine configured to encrypt the data to be forwarded to the physical layer.

6. The modem of claim 1, wherein the outbound memory manager is configured to register a data flow in the memory.

7. The modem of claim 1, wherein the outbound memory manager comprises one or more hardware state machines.

8. The modem of claim 1, wherein the modem is configured to be coupled to the host device to enable communication by the host device.

9. A method of moving data through a data link control layer of a wireless modem configured to be paired with a host device, the data link control layer having a hardware portion and a software portion, the method comprising:
receiving, in the hardware portion, data and control packets from the host device, the data destined for a physical layer coupled to a wireless medium;
parsing, in the hardware portion, the control packets to the software portion, the data remaining in the hardware portion, wherein an outbound memory manager of the hardware portion is configured to receive control information through at least one control interface and at least one command interface;
based on the control information:
determining, in the hardware portion, locations in memory to store the data;
storing, in the hardware portion, the data in the locations of the memory;
determining, in the hardware portion, which of the data is to be forwarded to the physical layer during a given transmit period; and
forwarding, in the hardware portion, the data to the physical layer; and
updating an outbound state table to maintain state information for multi-flow memory management.

10. The method of claim 9, wherein the data belongs to one or more of a plurality of data flows, and wherein the determining the locations in the memory comprises:
determining, in the hardware portion, the locations in the memory to store the data according to data flow.

11. The method of claim 9, wherein the receiving the data comprises:
receiving, in the hardware portion, data packets from the host device;
the method further comprising:
segmenting, in the hardware portion, the data packets into data cells, the data received comprising the data cells.

12. The method of claim 9, further comprising:
receiving an automatic repeat request bit map from the software portion, the automatic repeat request bit map indicating failed data;
wherein the determining which of the data is to be forwarded to the physical layer uses information in the automatic repeat request bit map.

13. The method of claim 9, further comprising:
checking, in the hardware portion, for the presence of failed data stored in the memory, the failed data to be retransmitted;
wherein the determining which of the data is to be forwarded comprises:
determining, in the hardware portion, which of the data is to be forwarded to the physical layer during the given transmit period, the data including the failed data.

14. The method of claim 9, further comprising:
encrypting, in the hardware portion, the data to be forwarded to the physical layer.

15. The method of claim 9, further comprising:
maintaining, in the hardware portion, state information about the stored data in a state table.

16. The method of claim 9, further comprising:
registering, in the hardware portion, a data flow in the memory.

17. The method of claim 9, further comprising:
enforcing, in the hardware portion, a drop policy for failed data.

18. The method of claim 9, wherein the modem is configured to be coupled to the host device to enable communication by the host device.

19. A wireless modem configured to be paired with a host device, comprising:
a processor configured to receive control fields from a physical layer, coupled to a wireless medium via a hardware portion, and to provide control information to the hardware portion and the host device; and
a memory;
the hardware portion comprising:
an inbound memory manager configured to:
receive data cells, the data cells bypassing the processor and being destined for the host device from the physical layer, wherein, based on the control information, the inbound memory manager is also configured to:
determine locations in the memory to store the data cells,
store the data cells in the memory, and
reassemble the data cells into data packets and forward the data packets to the host device, wherein the inbound memory manager is configured to receive the control information through at least one control interface and at least one command interface; and
an inbound state table containing state information maintained by the inbound memory manager for the data cells, said inbound state table configured to maintain state information for multi-flow memory management.

20. The modem of claim 19, wherein the inbound memory manager is configured to determine which ones of the data cells may be reassembled into the data packets.

21. The modem of claim 19, wherein the data cells belong to one or more of a plurality of data flows, and the inbound memory manager is configured to determine the locations in the memory to store the data cells according to data flow.

22. The modem of claim 19, wherein the hardware portion further comprises:
an inbound decryption engine configured to decrypt the data cells received from the physical layer.

23. The modem of claim 19, wherein the hardware portion further comprises:
an inbound window block configured to perform a window operation on the data cells received from the physical layer.

24. The modem of claim 19, wherein the hardware portion further comprises:
an inbound parser coupled to the inbound memory manager and configured to parse the data cells to the inbound memory manager and parse control fields to the software portion.

25. The modem of claim 19, wherein the inbound memory manager is configured to register at least one data flow in the memory in response to data flow information received from the software portion.

26. The modem of claim 19, wherein the inbound memory manager is configured to re-order the data cells according to sequence.

27. The modem of claim 19, wherein the modem is configured to be coupled to the host device to enable communication by the host device.

28. A method of moving data through a data link control layer of a wireless modem configured to be paired with a host device, the data link control layer having a hardware portion and a software portion, the method comprising:
receiving, in the hardware portion, data cells and control fields from a physical layer coupled to a wireless medium, the data cells destined for the host device;
parsing, in the hardware portion, control fields to the software portion, the data remaining in the hardware portion, wherein an inbound memory manager of the hardware portion is configured to receive control information through at least one control interface and at least one command interface;
determining, in the hardware portion, locations in memory to store the data cells;
storing, in the hardware portion, the data cells in the locations of the memory;
determining, in the hardware portion, which ones of the data cells may be reassembled into data packets;
reassembling, in the hardware portion, the ones of the data cells into the data packets;
forwarding, in the hardware portion, the data packets to the host device; and
updating an outbound state table containing state information maintained by an outbound memory manager for the data packets, said outbound state table configured to maintain state information for multi-flow memory management.

29. The method of claim 28, wherein the data cells belong to one or more of a plurality of data flows, and wherein the determining the locations in the memory comprises:
determining, in the hardware portion, the locations in the memory to store the data cells according to data flow.

30. The method of claim 28, further comprising:
decrypting, in the hardware portion, the data cells received from the physical layer.

31. The method of claim 28, further comprising:
performing, in the hardware portion, a window operation on the data cells received from the physical layer.

32. The method of claim 28, further comprising:
parsing, in the hardware portion, the data cells to remain in the hardware portion.

33. The method of claim 28, further comprising:
registering, in the hardware portion, at least one data flow in the memory in response to data flow information received from the software portion.

34. The method of claim 28, wherein the determining the locations in the memory comprises:
determining, in the hardware portion, the locations in memory to store the data cells such that the data cells are re-ordered according to a sequence.

35. The method of claim 28, wherein the modem is configured to be coupled to the host device to enable communication by the host device.

* * * * *

UNITED STATES PATENT AND TRADEMARK OFFICE
CERTIFICATE OF CORRECTION

| | | |
|---|---|---|
| PATENT NO. | : 8,339,945 B2 | |
| APPLICATION NO. | : 10/876280 | |
| DATED | : December 25, 2012 | |
| INVENTOR(S) | : Connors | |

It is certified that error appears in the above-identified patent and that said Letters Patent is hereby corrected as shown below:

On the Title Page, in Item (56), under "OTHER PUBLICATIONS", in Column 2, Line 3, delete "PCT/USO4/20714," and insert -- PCT/US04/20714, --, therefor.

In the Drawings:

In Fig. 8, Sheet 6 of 8, for Tag "810", in Line 1, delete "ROM SOFTWARE, FORWARD CONTROLS" and insert -- FROM SOFTWARE, FORWARD CONTROL --, therefor.

In the Specifications:

In Column 3, Line 18, delete "it's" and insert -- its --, therefor.

In Column 3, Line 50, delete "This" and insert -- These --, therefor.

In Column 4, Line 34, delete "it's" and insert -- its --, therefor.

In Column 4, Line 65, delete "network 102" and insert -- network 100 --, therefor.

In Column 5, Line 52, delete "modem 202" and insert -- modem 204 --, therefor.

In Column 5, Line 66, delete "modem 202." and insert -- modem 204. --, therefor.

In Column 6, Line 6, delete "modems 202" and insert -- modems 204 --, therefor.

In Column 6, Line 22, delete "host device 204" and insert -- host device 202 --, therefor.

In Column 6, Line 48, delete "modem 202." and insert -- modem 204. --, therefor.

Signed and Sealed this
Ninth Day of July, 2013

Teresa Stanek Rea
*Acting Director of the United States Patent and Trademark Office*

CERTIFICATE OF CORRECTION (continued)

In Column 7, Line 12, delete "It to is" and insert -- It is --, therefor.

In Column 7, Line 21, delete "Complex" and insert -- complex --, therefor.

In Column 13, Lines 34-35, delete "(QRT) domain 504" and insert -- (QRT) domain 502 --, therefor.

In Column 13, Line 57, delete "the 416." and insert -- the memory 416. --, therefor.

In Column 14, Line 33, delete "OPCI" and insert -- OCPI --, therefor.

In Column 14, Line 38, delete "know" and insert -- known --, therefor.

In Column 15, Line 33, delete "was to time" and insert -- was time --, therefor.

In Column 16, Line 53, delete "was to time" and insert -- was time --, therefor.

In Column 19, Line 67, delete "the 416." and insert -- the memory 416. --, therefor.

In Column 20, Line 42, delete "was to time" and insert -- was time --, therefor.

In Column 21, Line 38, delete "with." and insert -- with --, therefor.